(12) United States Patent
Tsukamoto et al.

(10) Patent No.: US 11,338,671 B2
(45) Date of Patent: May 24, 2022

(54) HYDRAULIC TRANSAXLE

(71) Applicant: KANZAKI KOKYUKOKI MFG. CO., LTD., Amagasaki (JP)

(72) Inventors: Michio Tsukamoto, Amagasaki (JP); Hiroshi Sugimoto, Amagasaki (JP); Daisuke Murashima, Amagasaki (JP); Tetsuya Kawatani, Amagasaki (JP)

(73) Assignee: Kanzaki Kokyukoki Mfg. Co., Ltd., Amagasaki (JP)

(*) Notice: Subject to any disclaimer, the term of this patent is extended or adjusted under 35 U.S.C. 154(b) by 0 days.

(21) Appl. No.: 16/888,067

(22) Filed: May 29, 2020

(65) Prior Publication Data

US 2020/0376957 A1  Dec. 3, 2020

(30) Foreign Application Priority Data

May 31, 2019 (JP) .............................. JP2019-103060
May 31, 2019 (JP) .............................. JP2019-103061
May 31, 2019 (JP) .............................. JP2019-103062

(51) Int. Cl.
| | |
|---|---|
| *B60K 17/10* | (2006.01) |
| *F16H 39/14* | (2006.01) |
| *F16D 31/02* | (2006.01) |
| *F16H 57/02* | (2012.01) |
| *F16H 61/40* | (2010.01) |
| *F04B 1/324* | (2020.01) |

(52) U.S. Cl.
CPC ........... *B60K 17/105* (2013.01); *F16H 39/14* (2013.01); *B60Y 2200/223* (2013.01); *F04B 1/324* (2013.01); *F16D 31/02* (2013.01); *F16H 61/40* (2013.01); *F16H 2057/02052* (2013.01)

(58) Field of Classification Search
CPC .............................. F16H 39/14; B60K 17/105
See application file for complete search history.

(56) References Cited

U.S. PATENT DOCUMENTS

| | | | | | |
|---|---|---|---|---|---|
| 4,922,787 | A | * | 5/1990 | Fujisaki | ............... B60K 17/105 475/83 |
| 5,163,293 | A | * | 11/1992 | Azuma | ............... B60K 17/105 60/487 |
| 5,836,159 | A | | 11/1998 | Shimizu | |
| 6,988,362 | B2 | * | 1/2006 | Okada | ................. B60K 17/105 60/433 |
| 7,448,209 | B2 | * | 11/2008 | Abend | .................... F16H 39/14 60/484 |

(Continued)

*Primary Examiner* — Michael Leslie
(74) *Attorney, Agent, or Firm* — Sterne, Kessler, Goldstein & Fox P.L.L.C.

(57) ABSTRACT

A hydraulic transaxle of the present invention includes an axle, a hydraulic static transmission ("HST"), a center case that has pair of oil passages for circulating the hydraulic oil between the hydraulic pump and the hydraulic motor, and a gear mechanism that transmits an output of the HST to the axle. A case supports the axle and accommodates the HST while also forming an oil reservoir. A hydraulic motor of the HST includes a motor shaft, a cylinder block with a plurality of cylinders fixed to the motor shaft, a plurality of pistons inserted into the cylinders, a fixed swash plate abutted by the plurality of pistons, and a fixed swash plate holder that supports the fixed swash plate with respect to the case. The motor shaft of the hydraulic motor is supported by the center case and the fixed swash plate holder.

14 Claims, 20 Drawing Sheets

(56) References Cited

U.S. PATENT DOCUMENTS 7,503,172 B2 * 3/2009 Sakakura .............. B60K 17/10
    180/242
7,971,435 B2 * 7/2011 Sumomozawa ........ F16D 31/02
    60/464

* cited by examiner

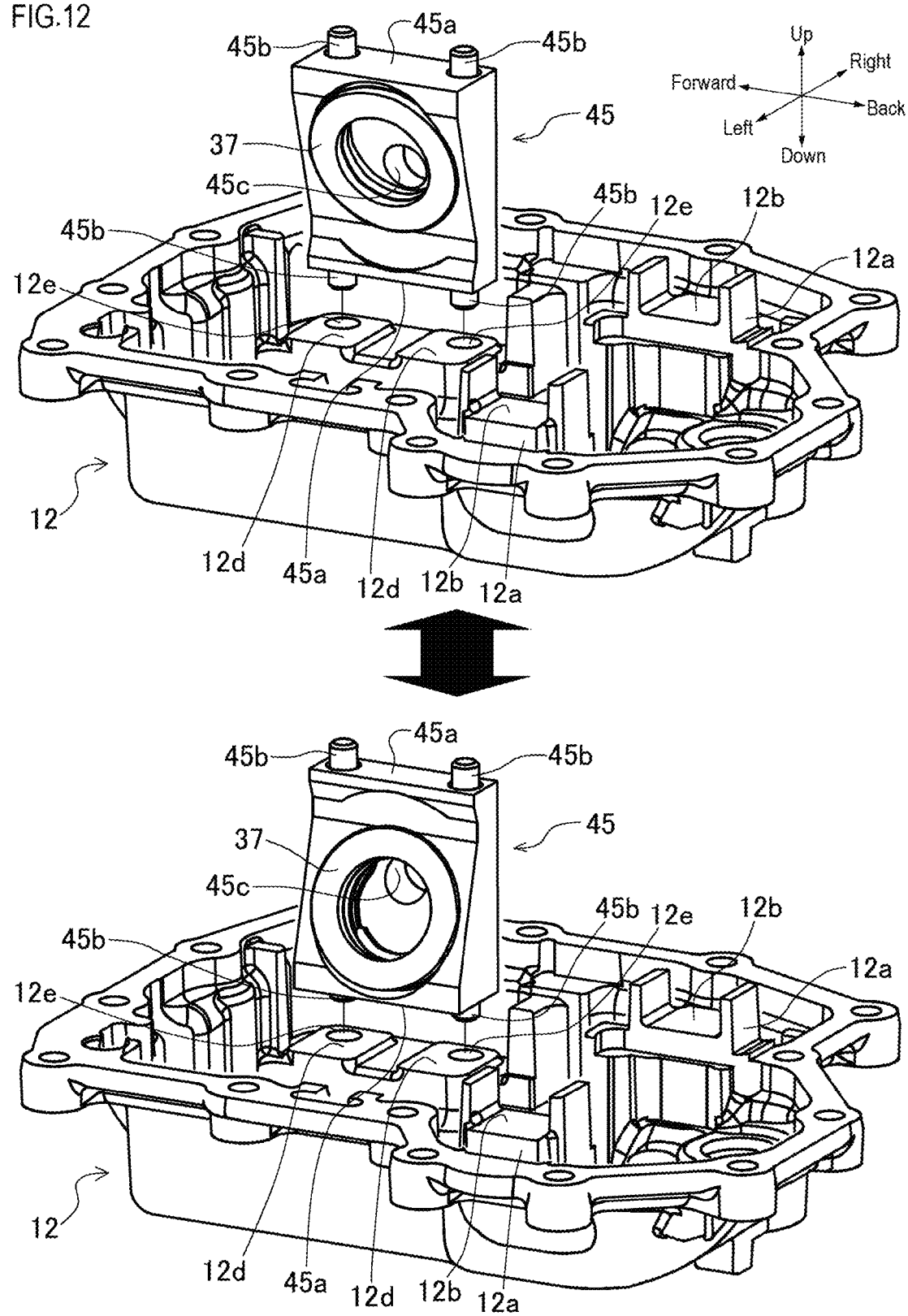

HYDRAULIC TRANSAXLE

BACKGROUND OF THE INVENTION

(1) Field of the Invention

At least one embodiment according to the present invention relates to a hydraulic transaxle.

(2) Description of Related Art

There is known a hydraulic transaxle including a hydraulic static transmission (hereinafter referred to as HST) in which a hydraulic pump and a hydraulic motor are fluidly connected by a center case. Conventionally, such a hydraulic transaxle including a hydraulic static transmission is generally provided with a transaxle case, in which the HST and a reduction gear train for decelerating a rotation output of the hydraulic motor are accommodated inside the transaxle case, and the axle is rotatably supported by the transaxle case.

In the hydraulic transaxle with such a configuration, generally, for example, as shown in U.S. Pat. No. 5,836,159, the transaxle case is filled with oil, and a partition wall is provided inside the axle case to make a division between a space (HST chamber) for accommodating the HST which includes the center case and a space (gear chamber) for accommodating the reduction gear train. The HST uses this oil as hydraulic oil, but the housing spaces for the HST and the reduction gear train are partitioned so that abrasion powder generated from the reduction gear train is not taken into the HST together with the oil.

In recent years, there is a need for further size reduction of the hydraulic transaxle in order to meet a need for further reduction in size and weight of work vehicles (e.g., mowers, snow blowers, etc.) each equipped with the hydraulic transaxle as described above. However, in the hydraulic transaxle with the conventional configuration where the partition wall is provided inside the transaxle case, there has been almost no room for improvement in space efficiency, and the size reduction has been difficult unless the size reduction of the center case or the like is achieved.

SUMMARY OF THE INVENTION

The present invention has been made in view of the current problem as thus described, and an object of the present invention is to provide a hydraulic transaxle having been further reduced in size as compared to the related art.

For achieving the above, a hydraulic transaxle of the present invention includes: an axle; a hydraulic static transmission that includes a hydraulic pump driven by a drive source, a hydraulic motor in which an output shaft is rotated and driven with hydraulic oil supplied by the hydraulic pump, and a center case in which a pair of oil passages for circulating the hydraulic oil between the hydraulic pump and the hydraulic motor is formed; a gear mechanism that transmits an output of the hydraulic static transmission to the axle; and a case that supports the axle and accommodates the hydraulic static transmission to form an oil reservoir. The hydraulic motor includes a motor shaft that is an output shaft, a cylinder block in which a plurality of cylinders are formed and that is coaxially fixed to the output shaft, a plurality of plungers inserted into the cylinders, a fixed swash plate abutted by the plurality of plungers, and a fixed swash plate holder that supports the fixed swash plate with respect to the case. The motor shaft of the hydraulic motor is bearing-supported by the center case and the fixed swash plate holder.

As described above, when the motor shaft of the hydraulic motor is supported by the center case and the fixed swash plate holder, it is possible to reduce the size of the center case and prevent an increase in the shaft vibration of the motor shaft.

Further, for achieving the above, the case of the hydraulic transaxle includes two supporting surfaces that support the fixed swash plate holder in a manner that the supporting surfaces face each other, and the fixed swash plate holder includes supported surfaces in contact with the supporting surface in a manner that the supported surfaces face the supporting surfaces. A bearing hole for the motor shaft is provided at a midpoint of the two supported surfaces in the fixed swash plate holder.

With the configuration as described above, the shaft vibration of the motor shaft can be reduced, and the support holder can be configured to be inverted vertically. Changing the direction of the support holder can facilitate a change in the rotating direction of the axle.

Further, for achieving the above, the case of the hydraulic transaxle is made up of at least two case members that are separated and joined on a plane including a motor axis. In the case, the supporting surfaces in contact with the respective supported surfaces are provided in the respective case members so as to sandwich the fixed swash plate holder when the case is joined.

With the configuration as described above, it is possible to facilitate the assembling work of the hydraulic transaxle.

Further, for achieving the above, in the center case of the hydraulic transaxle, a recess for fitting of a bearing configured to support the motor shaft is formed on a back side of a placement surface for the hydraulic motor in the center case, and a shaft hole for insertion of the motor shaft orthogonal to the placement surface is formed. In the center case, a pair of the oil passages is formed between the bearing fitted in the recess and the placement surface for the hydraulic motor, with the shaft hole located between the pair of oil passages.

With the configuration as described above, the center case can be reduced in size, and consequently, the hydraulic transaxle can be reduced in size.

Further, for achieving the above, in the hydraulic transaxle, of the pair of oil passages, the oil passage having a larger oil passage length is provided with two check valves that allow suction of oil in the oil reservoir only during replenishment of hydraulic oil, and the oil passage having a smaller oil passage length is provided with one check valve.

With the configuration as described above, it is possible to prevent deterioration in self-priming performance on the side of the pair of oil passages where the oil passage length is larger.

Further, for achieving the above, in the hydraulic transaxle, a shaft hole for rotatably supporting a rotating shaft included in the gear mechanism is formed on the back side of the placement surface for the hydraulic motor in the center case.

With the configuration as described above, the partition wall, having been provided in the case to support the rotating shaft of a counter gear, can be eliminated and the hydraulic transaxle can be reduced in size.

Further, for achieving the above, the gear mechanism of the hydraulic transaxle includes a final gear fixed to the axle and a counter gear that meshes with a motor output gear on the motor shaft. In the gear mechanism, the counter gear is disposed between the final gear and the center case.

With the configuration as described above, the hydraulic transaxle can be reduced in size.

The above and other features and effects will be apparent from the following detailed description of the invention with reference to the accompanying drawings.

BRIEF DESCRIPTION OF THE DRAWINGS

FIG. 12 is a perspective view showing a status in which a fixed swash plate holder is inverted vertically;

FIG. 13 is a perspective view showing a status in which a plate has been assembled to a movable swash plate holder, where

FIG. 14 is a perspective view showing the center case, where

DETAILED DESCRIPTION OF PREFERRED EMBODIMENTS

Figure 1:
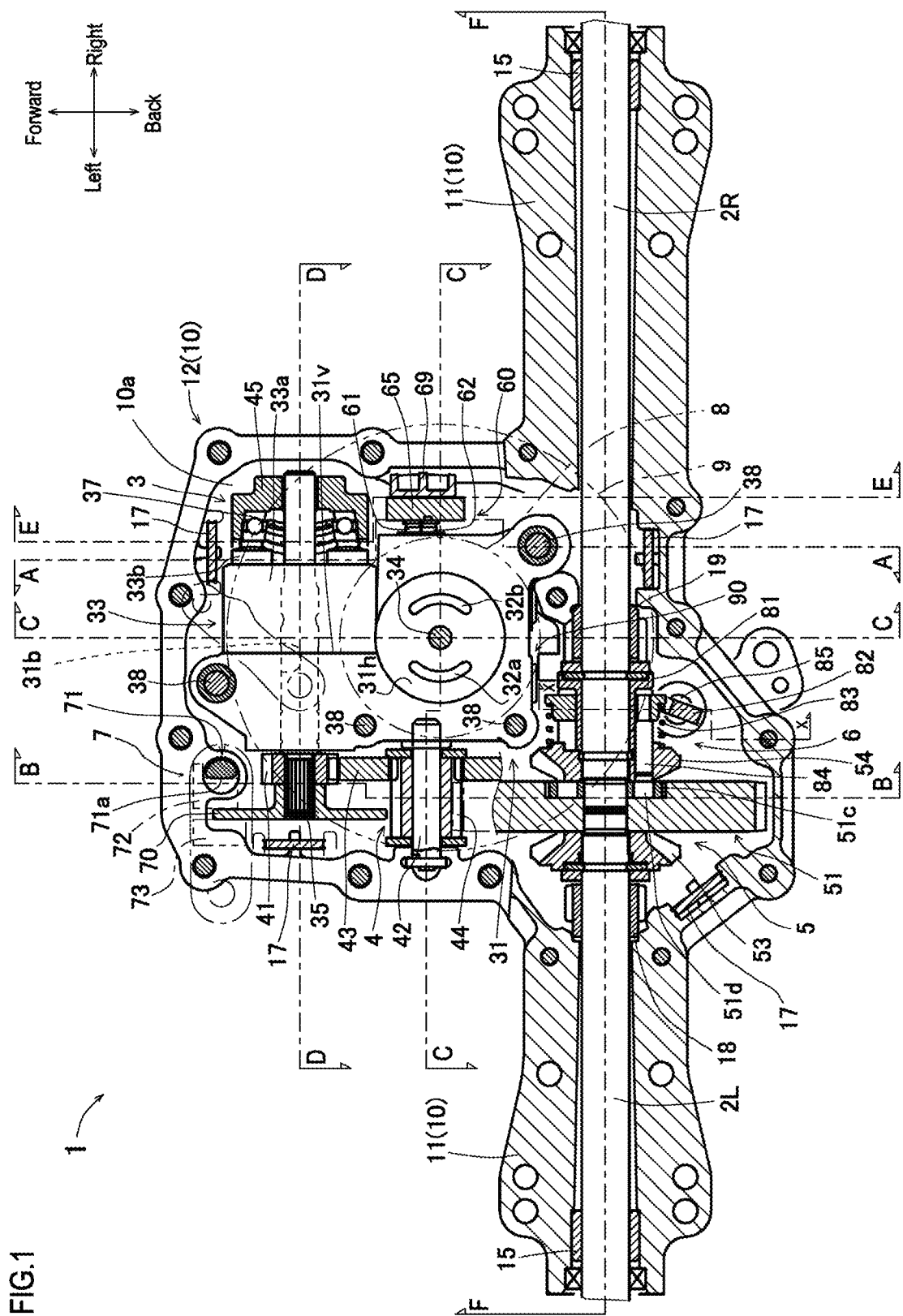
FIG. 1 is a partial plan sectional view of a transaxle with an upper housing removed.

Next, embodiments of the invention will be described. Although some embodiments will be described below with reference to the accompanying drawings, the embodiments and drawings are merely examples and are not intended to be limiting. In some drawings, the same elements are denoted by the same reference numerals.
Configuration of Hydraulic Transaxle A configuration of a hydraulic transaxle will be described. In the following description, the front-rear direction, the right-left direction, and the up-down direction of the hydraulic transaxle are defined as indicated by arrows in the figures.

As shown in FIGS. 1 to 7, a transaxle 1 that is an embodiment of the hydraulic transaxle according to the present invention includes a transaxle case 10. The transaxle case 10 is configured by fastening an upper housing 11 and a lower housing 12 with a plurality of bolts. The transaxle case 10 has a storage chamber 10a that is a hermetically sealed single space, and serves as a tank for storing hydraulic oil.

An HST 3, a reduction gear train 4, a differential gear device 5, a differential lock mechanism 6, a brake mechanism 7, and the like are disposed in the storage chamber 10a formed inside the transaxle case 10. The storage chamber 10a is filled with oil (hydraulic oil) used for driving the HST 3 and lubricating the HST 3 and the reduction gear train 4. A portion of the storage chamber 10a for accommodating the reduction gear train 4 is offset to the left side, and that portion is disposed in front of a portion for accommodating the differential gear device 5. A portion of the storage chamber 10a for accommodating the HST 3 is a portion disposed on the right side of the portion for accommodating the reduction gear train 4 and is also disposed in front of the portion for accommodating the differential gear device 5.

As thus described, the transaxle 1 has a configuration in which an integral storage chamber 10a is provided inside the transaxle case 10, in other words, a configuration in which a partition wall is not provided between the portions inside the transaxle case 10 where the HST 3, the reduction gear train 4, and the like are disposed. For this reason, the size in the right- and left direction of the transaxle case 10 can be reduced by an amount corresponding to the omission of the partition wall between the HST 3 and the reduction gear train 4, thereby achieving the size reduction of the transaxle case 10.

A right axle 2R extends to penetrate the upper housing 11 and is rotatably supported by a bush (needle bearing) 15 in the right outer end portion of the upper housing 11. A left axle 2L extends to penetrate the upper housing 11 and is rotatably supported by a bush 15 in the left end portion of the upper housing 11. The inner end portions of the respective left and right axles 2L, 2R are disposed in the rear inside the storage chamber 10a. Specifically, the inner end portions of the left and right axles 2L, 2R are fitted into a shaft center hole of a ring gear 51 of the differential gear device 5 and face each other.

Figure 8:
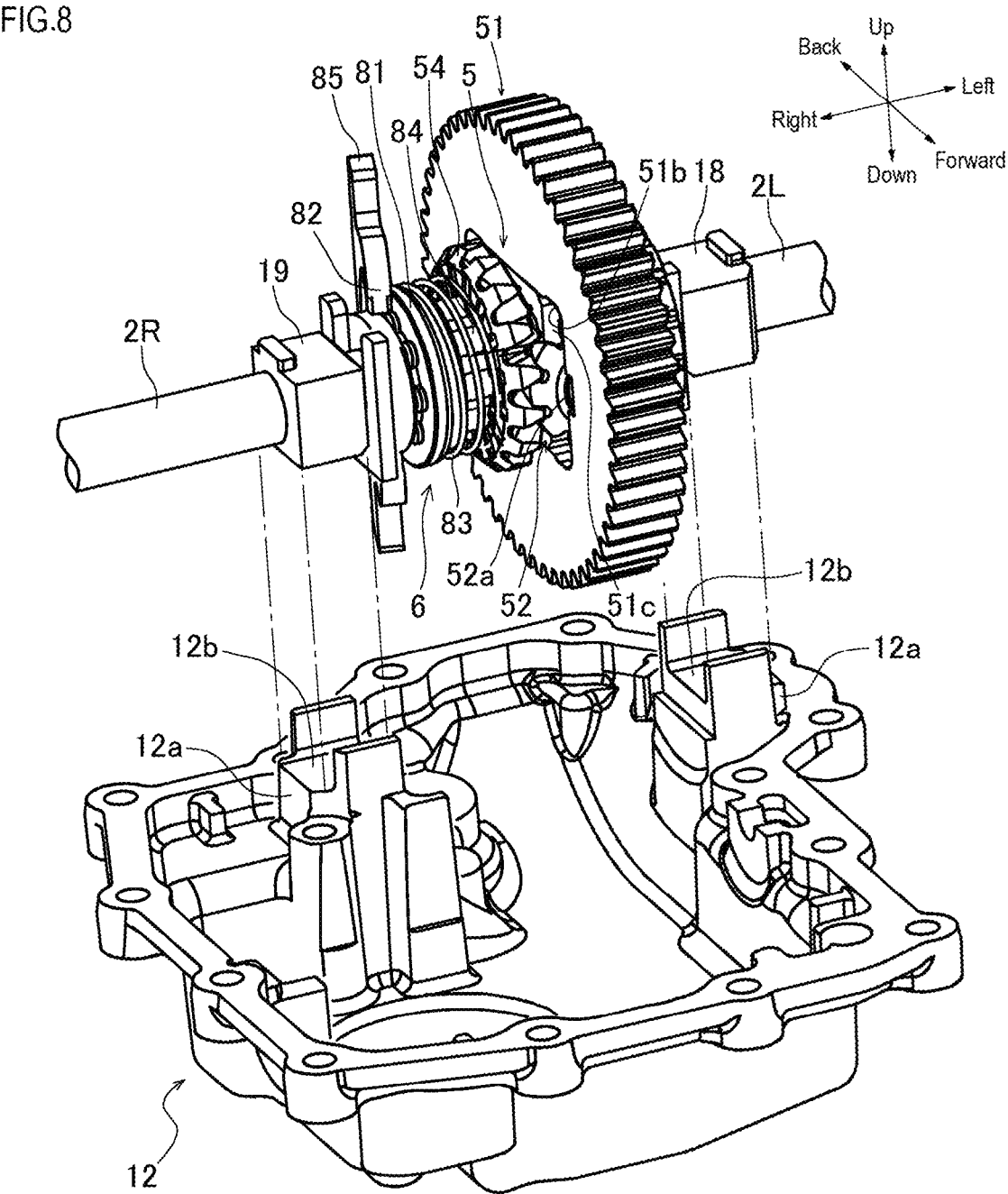
FIG. 8 is a partial perspective view showing a form in which the axle is supported by a lower housing.

As shown in FIG. 8, the right end portion of the left axle 2L is rotatably supported by a square bush (needle bearing) 18 where the left axle 2L is inserted. The square bush 18 is fitted into a square recess 12b formed in a bearing pedestal 12a formed in the lower housing 12, and is supported by the lower housing 12. The left end portion of the right axle 2R are rotatably supported by a square bush (needle bearing) 19 where the right axle 2R is inserted. The square bush 19 is fitted into the square recess 12b formed in the bearing pedestal 12a formed in the lower housing 12, and is supported by the lower housing 12. In the transaxle 1, the respective left and right axles 2L, 2R are configured to be rotatably supported by the respective square bushes 18, 19, thereby facilitating the positioning of the axles 2L, 2R and improving the working efficiency during assembly of the transaxle 1.

As shown in FIGS. 1 to 7, the lower housing 12 has a substantially cubic internal space, and the storage chamber 10a of the transaxle case 10 has a bottom surface 10b having a series of planar shape except for a placement portion (an oil reservoir 16 described below) for an oil filter 20. As described above, in the transaxle case 10, the bottom surface 10b is formed into a flat shape to reduce irregularities in the outer shape on the bottom side of the transaxle case 10, thereby reducing the size of the transaxle case 10. Further, in the transaxle 1, the substantially cubic internal space is formed in the lower housing 12, to ensure the amount of oil retained in the transaxle case 10 (storage chamber 10a) while the size is reduced.

Figure 9:
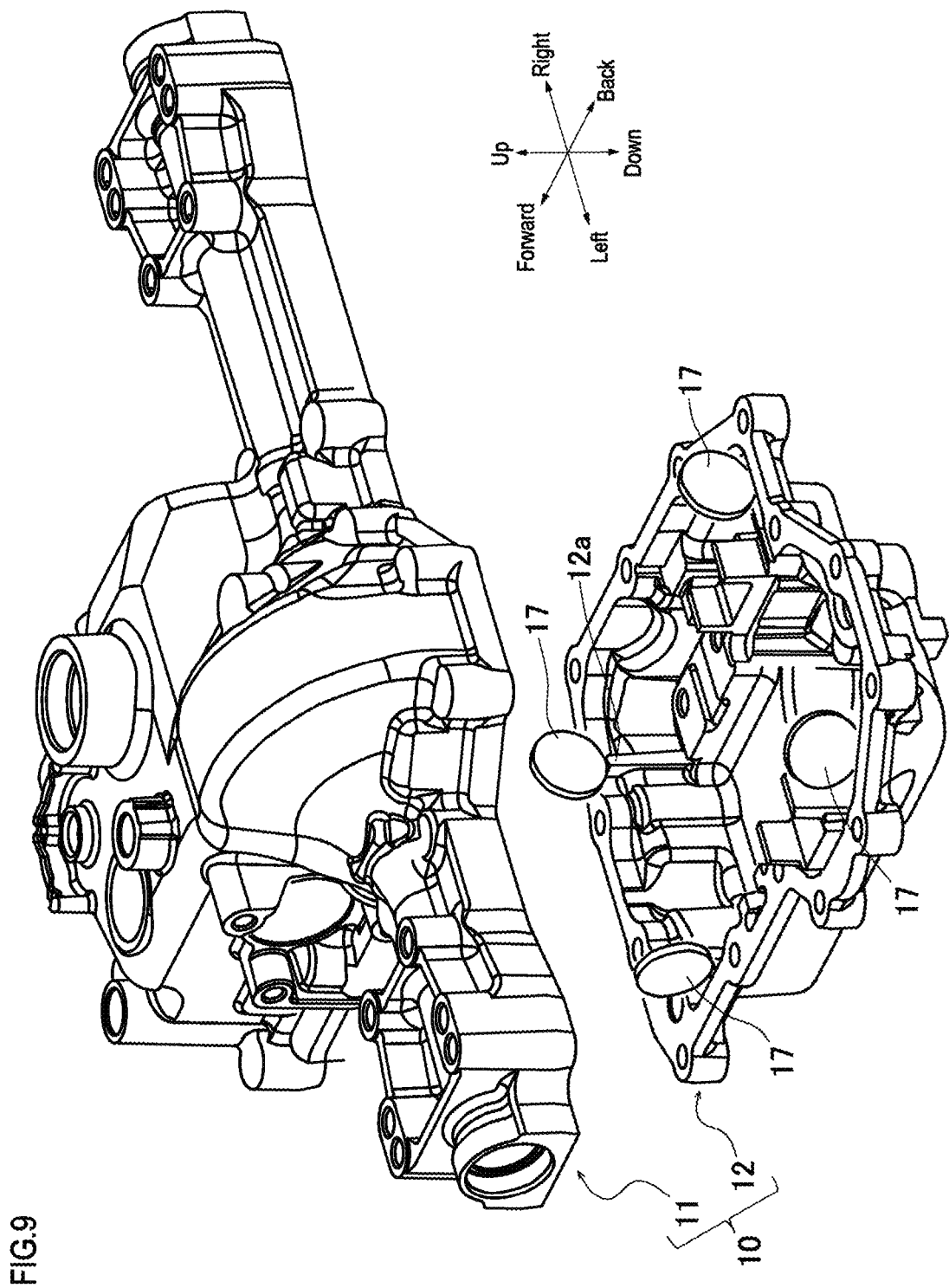
FIG. 9 is a partial perspective view showing a form in which the axle is supported by the lower housing.

As shown in FIG. 9, a magnet 17 is disposed at an appropriate position in the storage chamber 10a of the transaxle case 10. The magnet 17 is a means for collecting iron-based abrasion powder generated by abrasion of each gear constituting the reduction gear train 4. In the example shown in the present embodiment, a total of four magnets 17 are provided in the storage chamber 10a, and the number of the magnets 17 arranged has been increased as compared to the conventional transaxle. In the transaxle case 10, although a partition wall between a part where the HST 3 is disposed and a part where the reduction gear train 4 is disposed is omitted, the abrasion powder generated around the reduction gear train 4 is prevented from being diffused to the periphery of the HST 3 by collecting the abrasion powder with the magnet 17. As a result, it is possible to prevent the occurrence of a problem caused by the friction of the abrasion powder in the HST 3.

Although the transaxle 1 shown in the present embodiment is provided with a total of four magnets 17 in order to collect the abrasion powder in the storage chamber 10a, it is preferable to provide a total of two or more magnets 17, that is, at least one magnet 17 in the portion corresponding to the conventional HST chamber in the storage chamber 10a and at least one magnet 17 in the portion corresponding to the conventional gear chamber (i.e., reduction gear train 4 and differential gear device 5).

Figure 10:
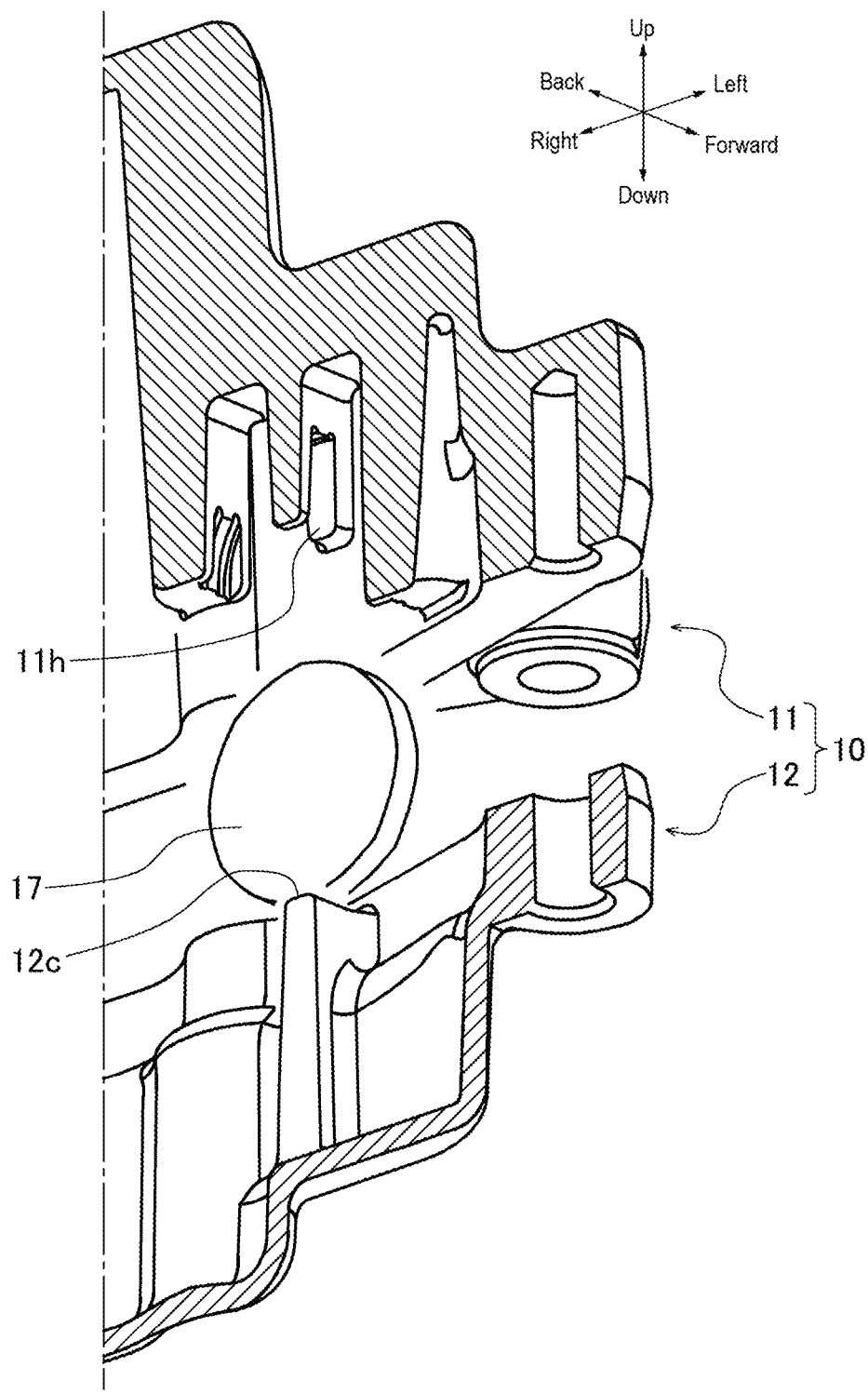
FIG. 10 is a partial perspective view showing a state in which a magnet is held by a transaxle case.

As shown in FIGS. 9 and 10, a holder portion 11h, which is a recessed part for holding the magnet 17, is formed on the upper housing 11 side in the storage chamber 10a. An abutment portion 12c is formed on the lower housing 12 side in the storage chamber 10a so as to face the holder portion 11h when the upper housing 11 and the lower housing 12 are joined. The magnet 17 accommodated in the holder portion 11h is held in the holder portion 11h by the abutment of the abutment portion 12c when the upper housing 11 and the lower housing 12 are joined.

Figure 4:
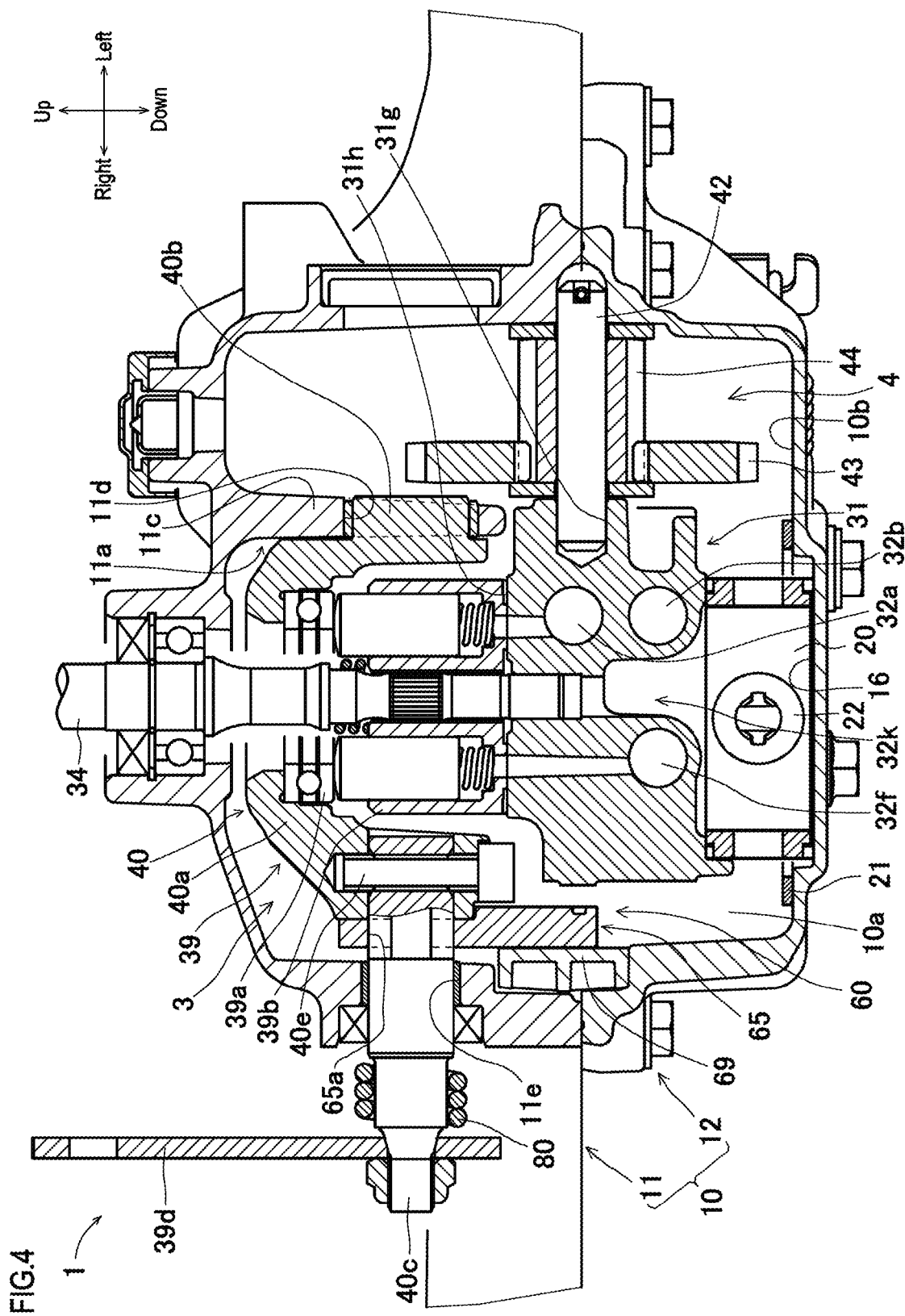
FIG. 4 is a sectional view of the transaxle at position C-C in FIG. 1.

Further, as shown in FIG. 4, a magnet 21 in a sheet form is disposed on the bottom surface 10b of the lower housing 12 so as to surround the oil filter 20. By disposing the magnet 21 on the bottom surface 10b, abrasion powder caused by gear deceleration that collects on the bottom surface 10b at the time of stopping or the like can be efficiently collected. As a result, it is possible to reliably prevent the occurrence of a problem caused by the friction of the abrasion powder in the HST 3. Further, a magnet 22 having a coin shape with a hole is supported in the oil filter 20, and fine iron-based abrasion powder having entered the oil filter 20 is captured by the magnet 22.

HST

As shown in FIGS. 1 to 7, the HST 3 includes a center case 31 fixed to the upper housing 11 with four bolts 38, an axial piston type hydraulic pump 39 attached to the center case 31, and an axial piston type hydraulic motor 33 attached to the center case 31. A horizontal surface 31h is formed in the rear half of the center case 31, and the hydraulic pump 39 is attached to the horizontal surface 31h so that the hydraulic pump 39 is extended upward from the rear half of the center case 31. A vertical surface is formed on the right side surface of the front half of the center case 31, and the hydraulic motor 33 is attached to the vertical surface so that the hydraulic motor 33 is linked to the reduction gear train 4 disposed on the left side thereof.

A lower portion of a vertical pump shaft 34, which is a rotary shaft center of the hydraulic pump 39 (i.e., an input shaft of the HST 3) is rotatably supported in the rear half of the center case 31, and the vertical pump shaft 34 extends upward so that its upper end portion projects upward from the upper end of the upper housing 11 in the transaxle case 10. An input pulley 8 and a cooling fan 9 are fixed to the upper end portion of the pump shaft 34. A belt (not shown) is wound around the input pulley 8, and the input pulley 8 is drivably coupled to a prime mover such as an internal combustion engine through the belt.

The transaxle 1 supporting the left and right axles 2L, 2R is configured such that power from a prime mover (not shown) is input from the input pulley 8 provided on a pump shaft 34, and the power is output to the left and right axles 2L, 2R through the reduction gear train 4 and the differential gear device 5.

A vertical surface 31v that is a receiving portion for the hydraulic motor 33 is formed in the front half of the center case 31, and the hydraulic motor 33 is attached to the vertical surface 31v, so that the hydraulic motor 33 is extended rightward from the front half of the center case 31. A motor shaft 35 which is an output shaft of the hydraulic motor 33 is projected from the left side of the center case 31, and a motor output gear 41 for outputting a rotation output from the hydraulic motor 33 is disposed at the tip of the motor shaft 35. A brake disc 70 is disposed on the side of motor shaft 35 closer to the tip of motor shaft 35 than a placement portion for the motor output gear 41 in the motor shaft 35. The hydraulic motor 33 is linked to the reduction gear train 4 through the motor output gear 41 fixed on the motor shaft 35.

In the transaxle 1, the motor output gear 41 and the brake disc 70 are configured separately, and the motor output gear 41 and the brake disc 70 can be configured using different materials. In the transaxle 1, the motor output gear 41 is made of ordinary steel, and the brake disc 70 is made of a sintered material. In the transaxle 1, the motor output gear 41 is made of steel to reduce the manufacturing cost of the motor output gear 41.

Figure 11:
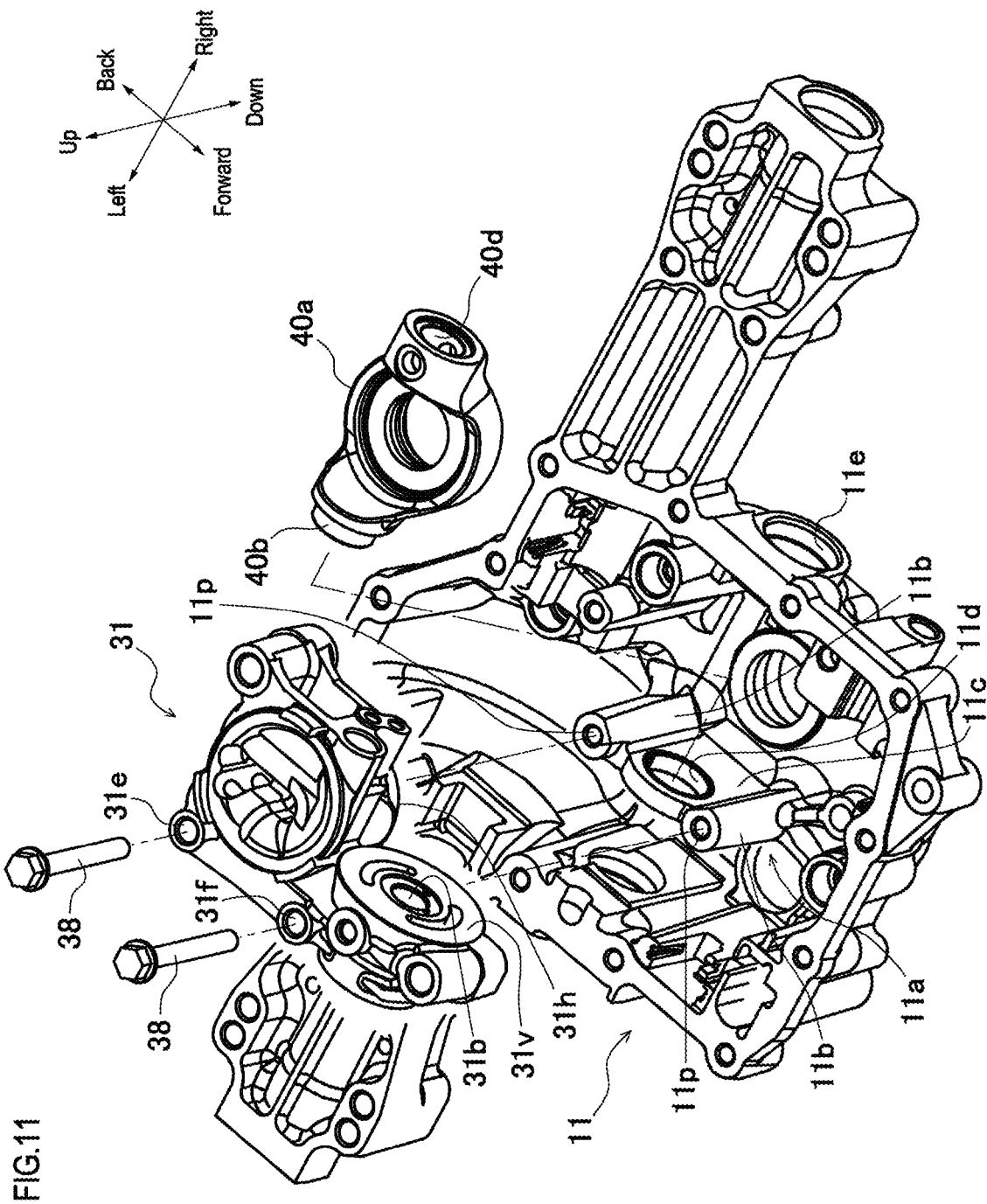
FIG. 11 is a perspective view showing a state in which a center case is supported by the upper housing.

As shown in FIG. 11, in the transaxle 1, a support wall 11a projects from the upper inner surface of the upper housing 11. The support wall 11a is a part for supporting the center case 31 of the HST 3 and is made up of two bolt boss-shaped column portions 11b, 11b and a wall portion 11c connecting therebetween. A shaft hole 11d is formed in the wall portion 11c. The shaft hole 11d is a hole for rotatably supporting a first trunnion shaft 40b that is one of the trunnion shafts connected to a movable swash plate 39a. Bolt holes 11p, 11p are formed on the end surfaces of the column portions 11b, 11b.

Holes 31e, 31f are formed in parts on the horizontal surface 31h of the center case 31, the parts facing the bolt holes 11p, 11p, and two bolts 38, 38 are inserted into the holes 31e, 31f and screwed into the bolt holes 11p, 11p of the column portions 11b, 11b, whereby the center case 31 is fixed to the upper housing 11. The shaft hole 11d for rotatably supporting the first trunnion shaft 40b is formed between the column portions 11b, 11b screwed with the two bolts 38, 38, that is, between the bolt holes 11p, 11p formed at two locations in the respective column portions 11b, 11b. With such a configuration, the space between the bolt holes 11p, 11p can be effectively utilized, and therefore, even when the support wall 11a is provided, the size reduction of the transaxle case 10 is not hindered. Furthermore, with such a configuration, the column portions 11b, 11b also serve as reinforcements of the wall portion 11c, thereby ensuring the strength of the shaft hole 11d while firmly supporting the center case 31 with respect to the transaxle case 10.

The transaxle 1 includes the oil filter 20. A lower portion of a lower housing 12 in the transaxle 1 is the oil reservoir 16 and accommodates the HST 3, the motor shaft 35 of the hydraulic motor 33, and the reduction gear train 4, the HST 3 being formed by a fluid connection between the hydraulic pump 39 of a variable volume type and the hydraulic motor 33 of a fixed volume type through a closed circuit. The HST 3 in the transaxle case 10 is operated through the fluid connection between the hydraulic pump 39 and the hydraulic motor 33 through a pair of oil passages 32a, 32b formed in the center case 31. Kidney-shaped ports are opened at both ends of the oil passages 32a, 32b, respectively, and located at the horizontal surface 31h and the vertical surface 31v to communicate with cylinders of cylinder blocks 33a, 39b, respectively.

Fixed Swash Plate

As shown in FIGS. 1 to 7, the cylinder block 33a is rotatably supported on the vertical surface 31v that is an attached surface of the hydraulic motor 33, and a plurality of pistons 33b, 33b, . . . are reciprocally fitted into a plurality of cylinders 33c, 33c, . . . of the cylinder block 33a through energizing springs. The heads of the pistons 33b, 33b, . . . abut a fixed swash plate 37. The fixed swash plate 37 is fixed to a fixed swash plate holder 45 to maintain a predetermined angle with respect to the rotating shaft line of the hydraulic motor 33.

Figure 5:
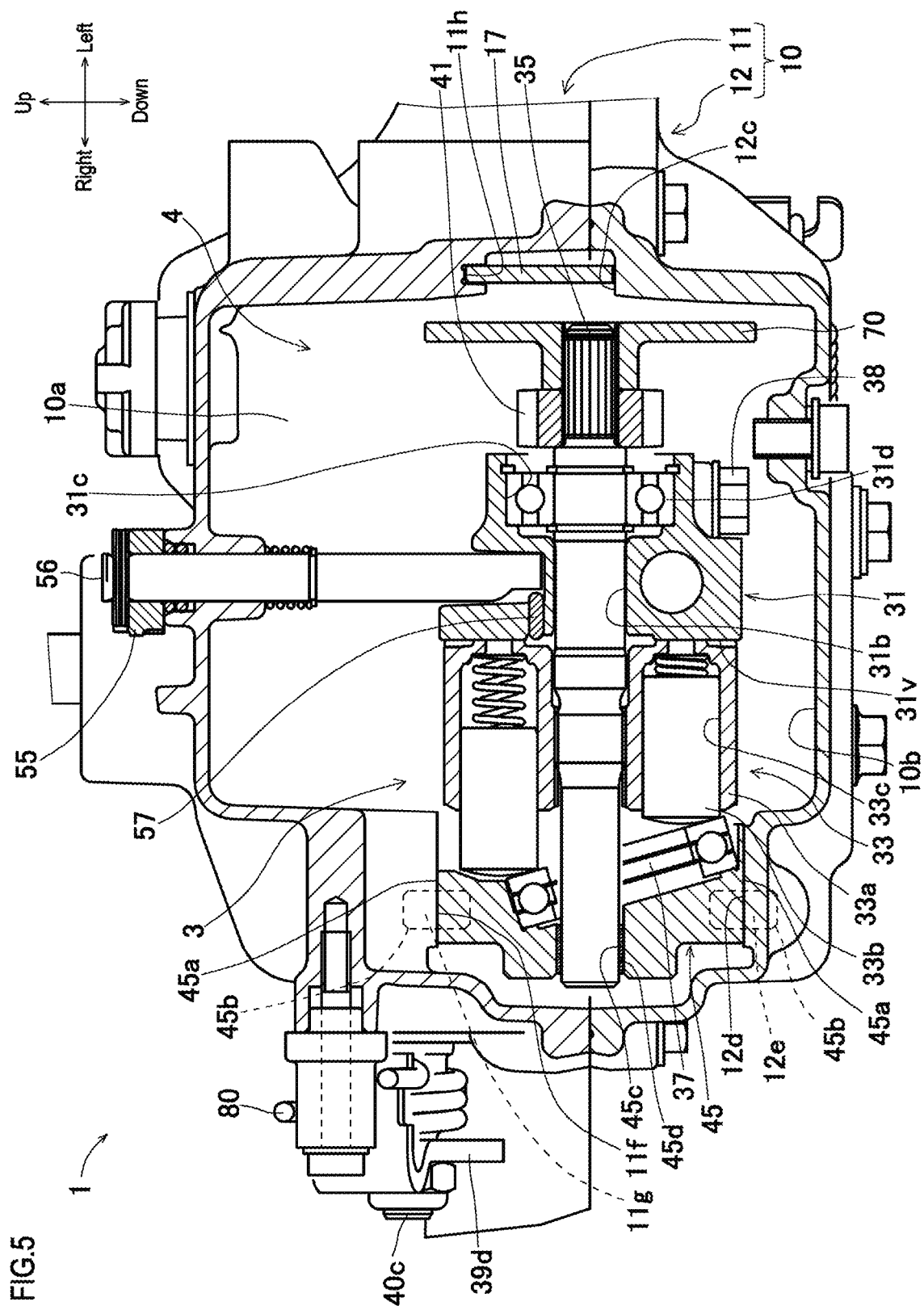
FIG. 5 is a sectional view of the transaxle at position D-D in FIG. 1.
Figure 6:
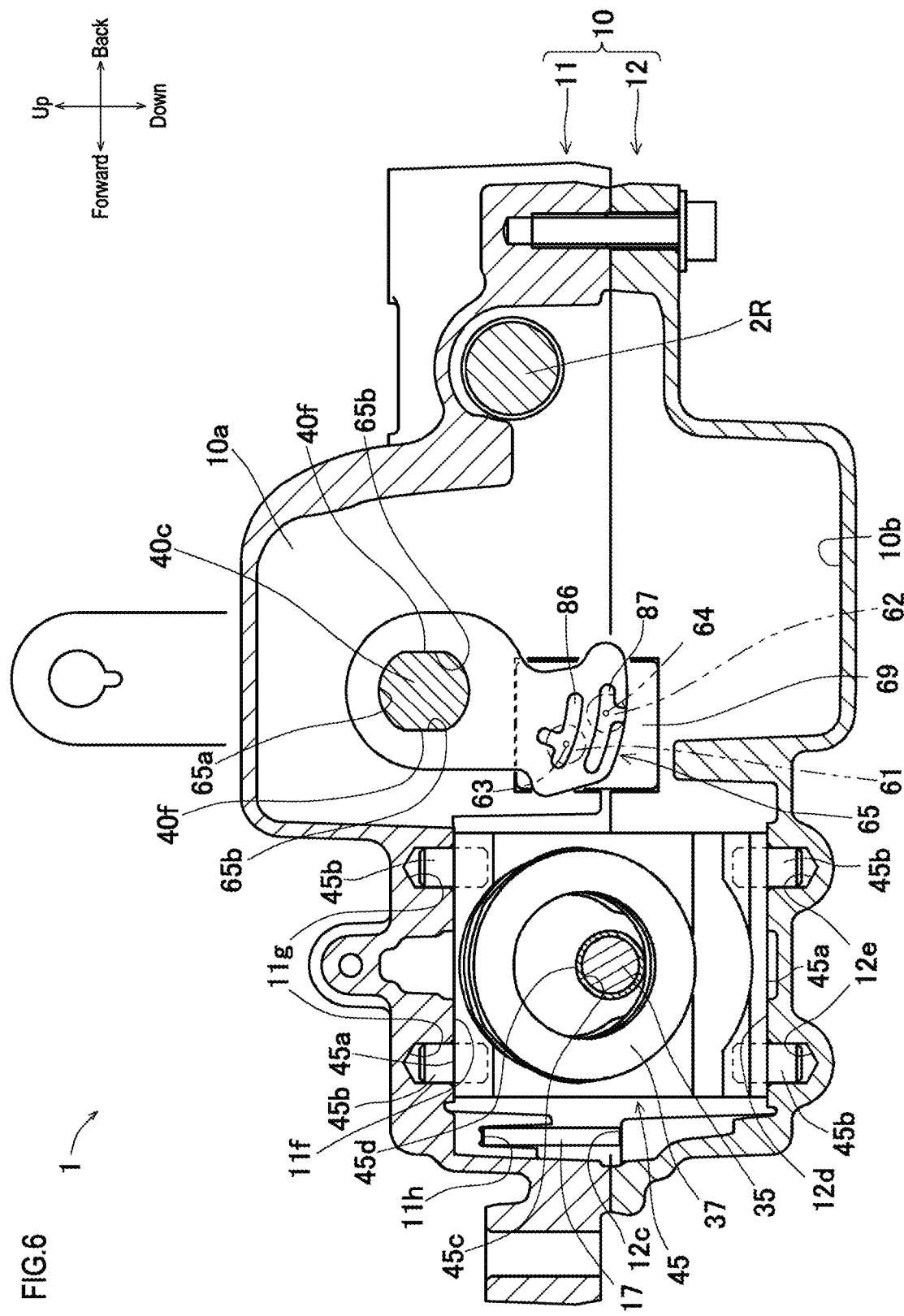
FIG. 6 is a sectional view of the transaxle at position E-E in FIG. 1.
Figure 7:
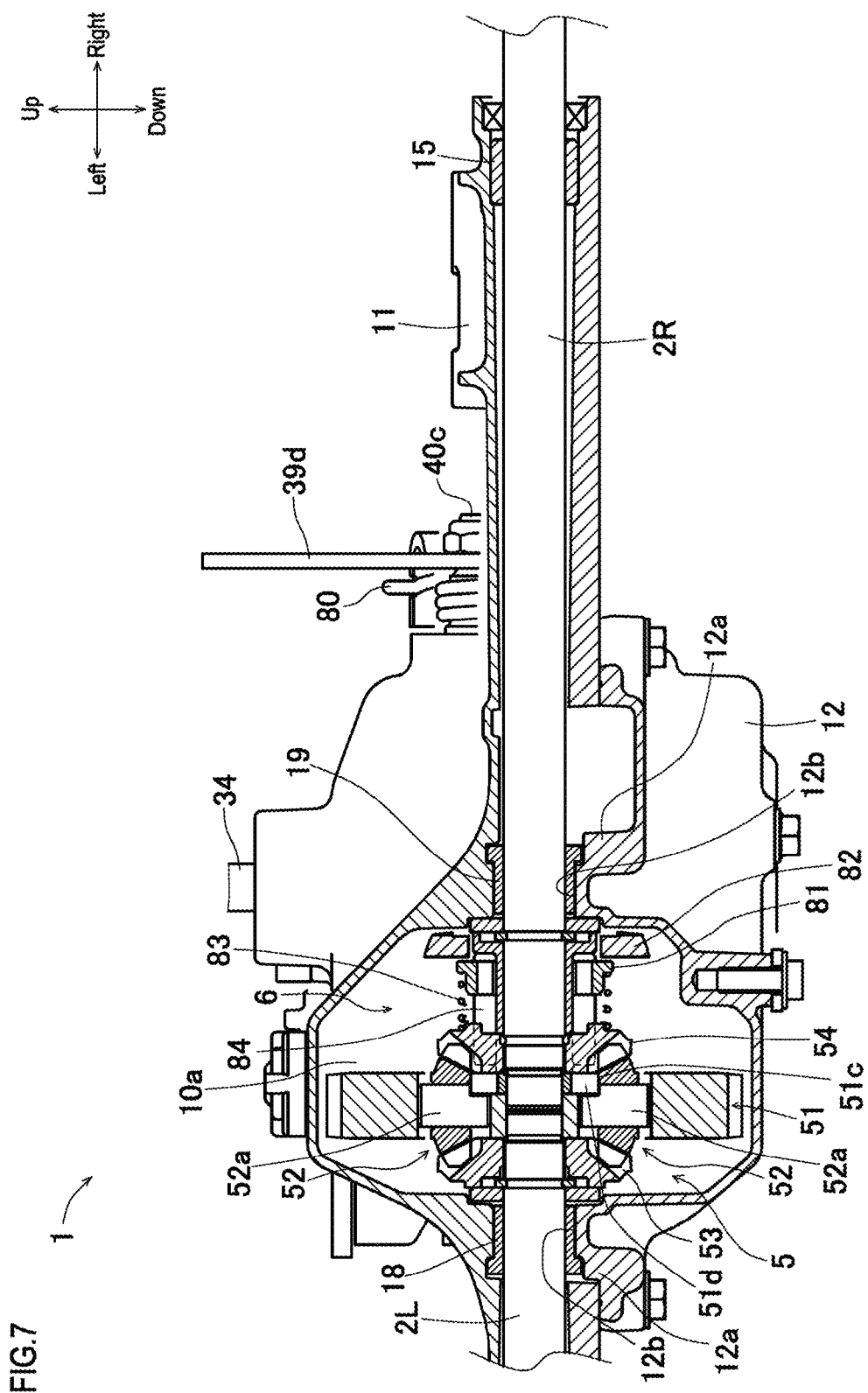
FIG. 7 is a sectional view of the transaxle at position F-F in FIG. 1.

As shown in FIG. 5, the fixed swash plate holder 45 is sandwiched and fixed between the upper housing 11 and the lower housing 12. A supporting surface 11f is formed on the upper housing 11, and a supporting surface 12d is formed on the lower housing 12. The supporting surfaces 11f and 12d are formed at positions facing each other in the transaxle case 10.

Supported surfaces 45a, which are plane portions in contact with the supporting surface 11f of the upper housing 11 and the supporting surface 12d of the lower housing 12, are formed at the upper and lower end portions of the fixed swash plate holder 45. The upper and lower supported surfaces 45a, 45a are parallel to each other. Pins 45b, 45b at two locations are projected from the respective supported surfaces 45a of the fixed swash plate holder 45. Pin holes 11g, 11g are formed at positions corresponding to the pins 45b, 45b on the supporting surface 11f of the upper housing 11, and pin holes 12e, 12e are formed at positions corresponding to the pins 45b, 45b on the supporting surface 12d of the lower housing 12.

The transaxle case 10 is made up of at least two housings 11, 12 that can be separated and joined on a plane including the axis of the motor shaft 35, and when the housings 11, 12 are joined to constitute the transaxle case 10, the housings 11, 12 are provided with the respective supporting surfaces 11f, 12d that sandwich the fixed swash plate holder 45. With such a configuration, the fixed swash plate holder 45 can be easily assembled to the transaxle case 10.

In the fixed swash plate holder 45, a bearing hole 45c is provided at a position intermediate between the supported surfaces 45a, 45a at the upper and lower end portions. The bearing hole 45c is a shaft hole for supporting the motor shaft 35, and a bush (needle bearing) 45d is provided between the bearing hole 45c and the motor shaft 35.

With such a configuration, the fixed swash plate holder 45 is positioned by the upper and lower pins 45b in the state of being sandwiched and fixed between the upper housing 11 and the lower housing 12. The respective axial centers of the pins 45b, 45b of the fixed swash plate holder 45 are disposed to be located flush with each other and match the axial centers of the upper and lower pins 45b, 45b. Therefore, even when the swash plate holder 45 is vertically inverted, the fixed swash plate holder 45 can be sandwiched and fixed between the upper housing 11 and the lower housing 12 without changing the position of the bearing hole 45c.

As shown in FIG. 12, in the transaxle 1, the angle of the fixed swash plate 37 can be inverted by vertically reversing the fixed swash plate holder 45, whereby the rotating direction of the axles 2L, 2R with respect to the tilting-motion direction of a movable swash plate 39a of the hydraulic pump 39 can be easily changed in accordance with specifications of a vehicle in which the transaxle 1 is mounted.

Shaft Supporting Portion of Hydraulic Motor

As shown in FIGS. 1 and 5, a recess 31c is formed in the back side of the center of the vertical surface 31v that is a placement surface for the hydraulic motor 33 of the center case 31, and a bearing 31d is fitted in the recess 31c. A shaft hole 31b with its axis orthogonal to the vertical surface 31v is formed in the center case 31 and communicated with the recess 31c.

The left portion of the right-left horizontal motor shaft 35, which is the rotary shaft center (i.e., the output shaft of the HST 3) of the hydraulic motor 33, is rotatably supported by the bearing 31d. The right portion of the motor shaft 35 extends rightward from the front half of the center case 31, and further, penetrates the cylinder block 33a of the hydraulic motor 33 to be rotatably supported by the fixed swash plate holder 45 disposed rightward thereof. More specifically, the right end portion of the motor shaft 35 is rotatably supported in the bearing hole 45c formed in the fixed swash plate holder 45, and a bush 45d is provided between the motor shaft 35 and the bearing hole 45c.

As described above, the left portion of the motor shaft 35 of the hydraulic motor 33 is rotatably supported by the bearing 31d formed in the center case 31, and the right portion thereof is rotatably supported by the bearing hole 45c (bush 45d) formed in the fixed swash plate holder 45. In the transaxle 1, the shaft supporting portion of the motor shaft 35 is carried by the fixed swash plate holder 45 disposed outside the center case 31, thereby achieving the size reduction of the center case 31. Further, while the size of the center case 31 is reduced, the shaft vibration of the motor shaft 35 is prevented, and the meshing posture of the motor output gear 41 with respect to a large-diameter counter gear 43 to be described later is favorably maintained so that an abnormal abrasion of the tooth surface can be reduced.

Hydraulic Pump

As shown in FIGS. 1 to 7 and 13, the movable swash plate 39a is a volume changing means for tilting the movable swash plate 39a so as to change the amount and direction of the hydraulic oil discharged from the hydraulic pump 39, and is held by the movable swash plate holder 40. The movable swash plate holder 40 includes a holder body 40a, the first trunnion shaft 40b inseparable from the holder body 40a, and a second trunnion shaft 40c separable from the holder body 40a. The first trunnion shaft 40b and the second trunnion shaft 40c as a pair constitute a turning shaft of the movable swash plate 39a.

The first trunnion shaft 40b parallel to the axles 2L, 2R is rotatably supported in the shaft hole 11d formed in the support wall 11a of the upper housing 11. The second trunnion shaft 40c parallel to the axles 2L, 2R and extending to the outside of the transaxle case 10 is rotatably supported in the hole 11e formed in the right wall of the upper housing 11. Both shafts 40b, 40c are disposed on the same axis line. A control lever 39d is attached to the outer end portion of the second trunnion shaft 40c. A substantially fan-shaped plate 65, serving as a closing means for orifices 63, 64 to be described later, is attached to the inner end portion of the second trunnion shaft 40c in the upper housing 11. The control lever 39d is coupled to a shift operation tool (not shown), such as a lever or a pedal provided in the vehicle, through a link mechanism (not shown).

In such a configuration of the volume changing means made up of the movable swash plate 39a and the trunnion shafts 40b, 40c, when the control lever 39d is turned, the movable swash plate 39a can be tilted around the turning shafts with the trunnion shafts 40b, 40c as the turning shafts, and accordingly, the amount of the hydraulic oil discharged from the hydraulic pump 39 is changed, so that the drive rotation speed and rotating direction of the hydraulic motor 33 (i.e., motor shaft 35) are controlled.

Configuration of Movable Swash Plate Holder

Figure 13A:
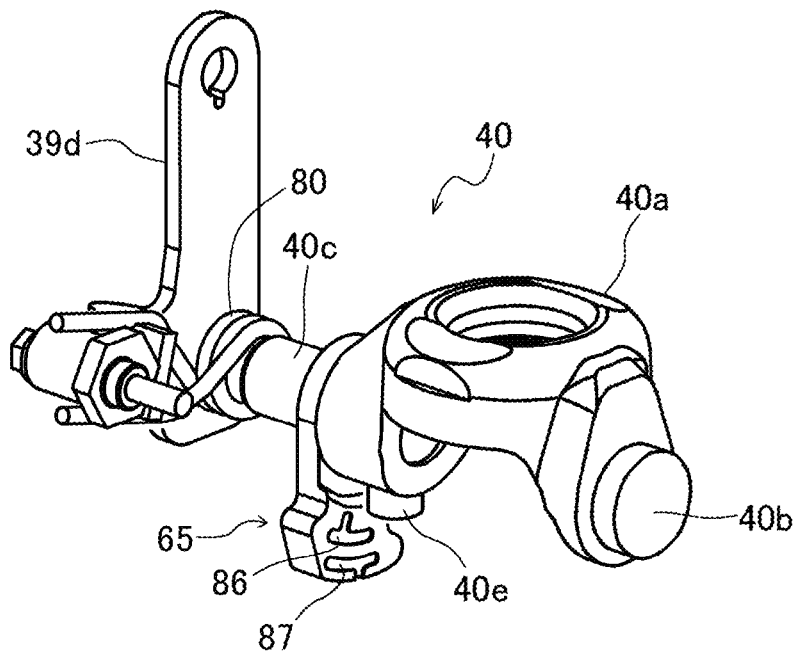
FIG. 13A is a perspective view showing a state after the assembly.
Figure 13B:
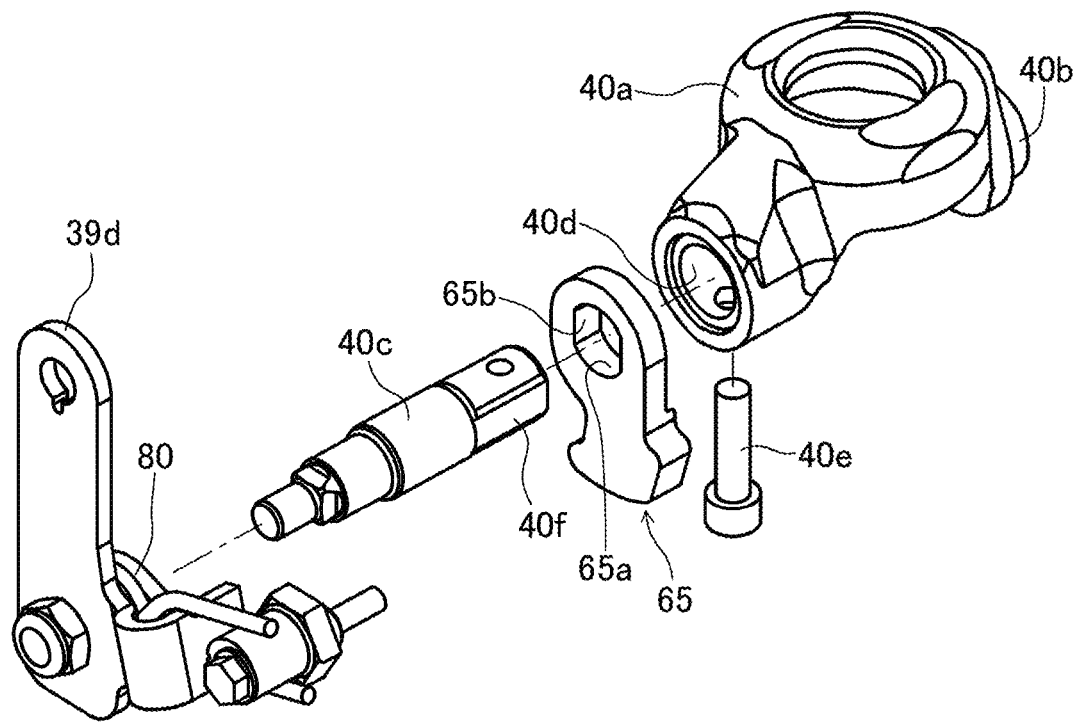
FIG. 13B is an exploded perspective view.
Figure 14A:
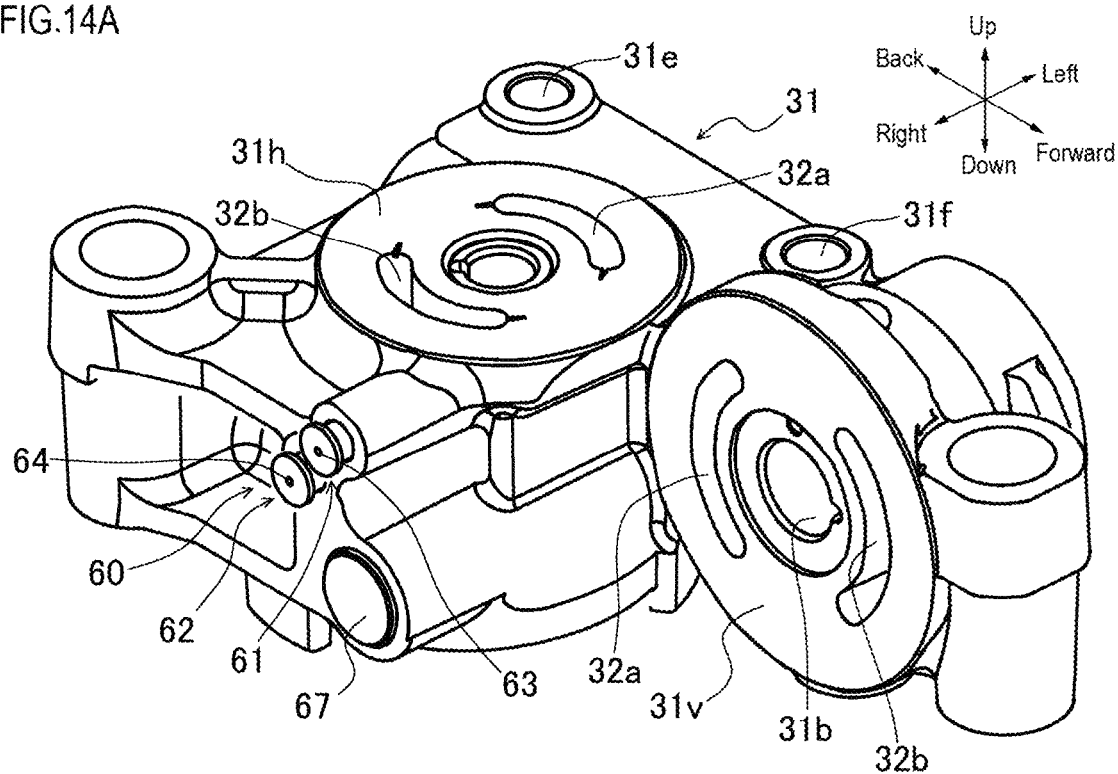
FIG. 14A is a perspective view as seen obliquely from the front right upper side.
Figure 14B:
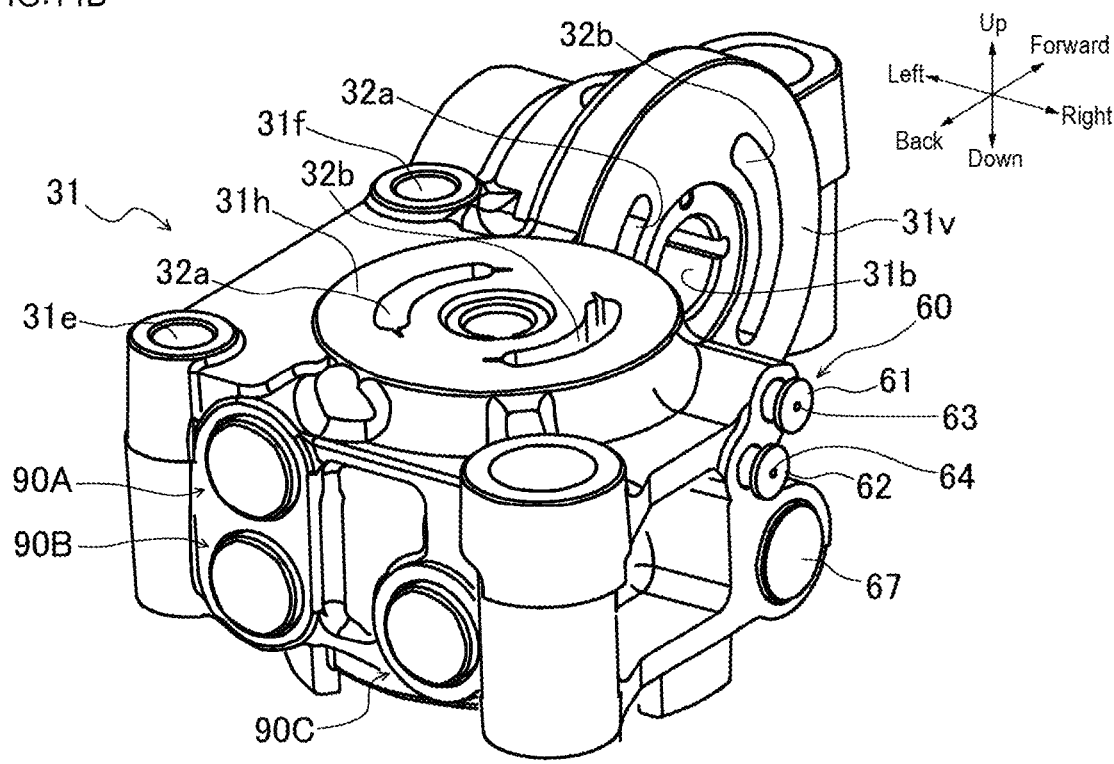
FIG. 14B is a perspective view as seen obliquely from the rear right upper side.
Figure 15:
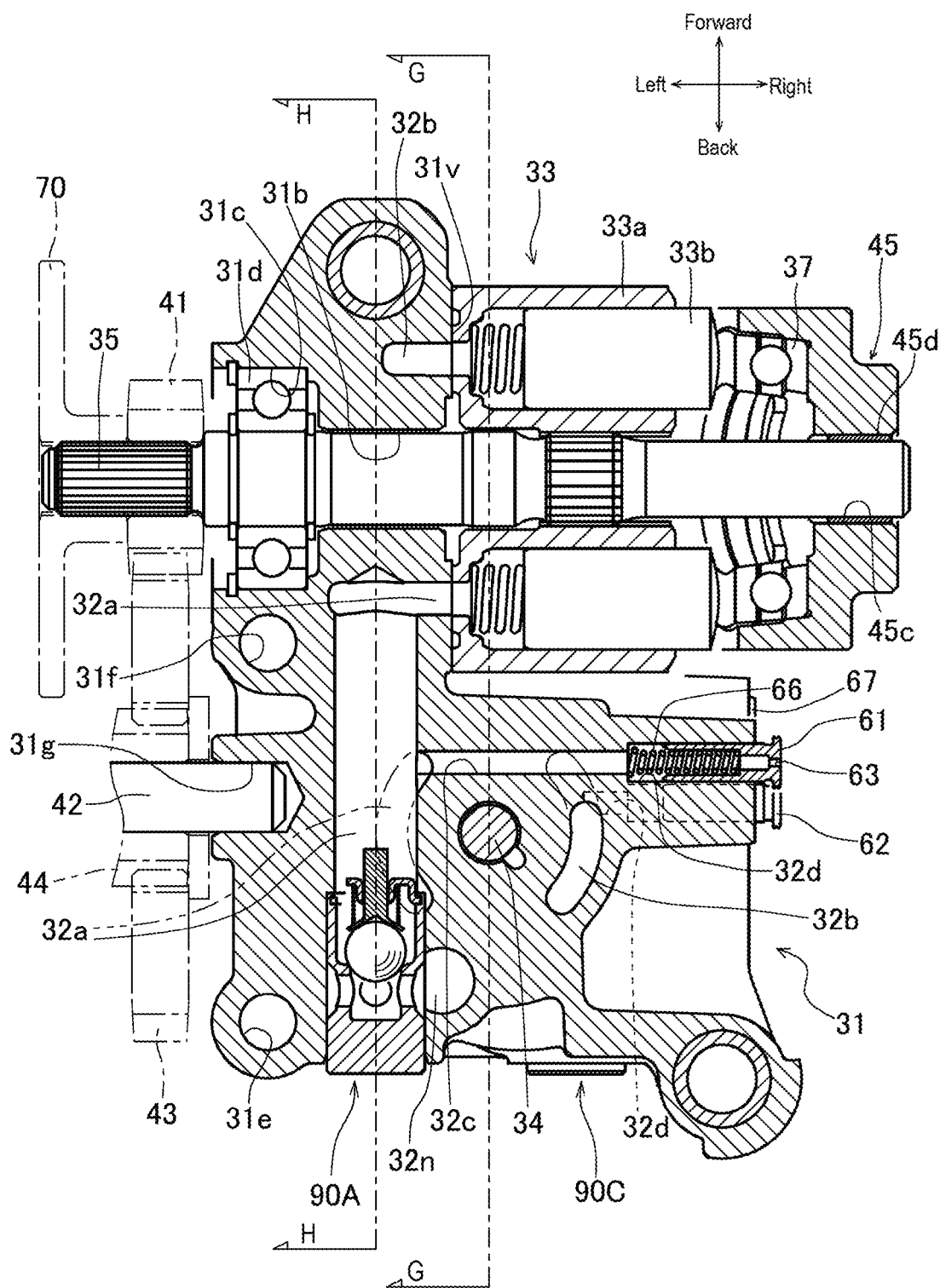
FIG. 15 is a sectional view of an HST (center case portion) at position J-J in FIG. 17.
Figure 16:
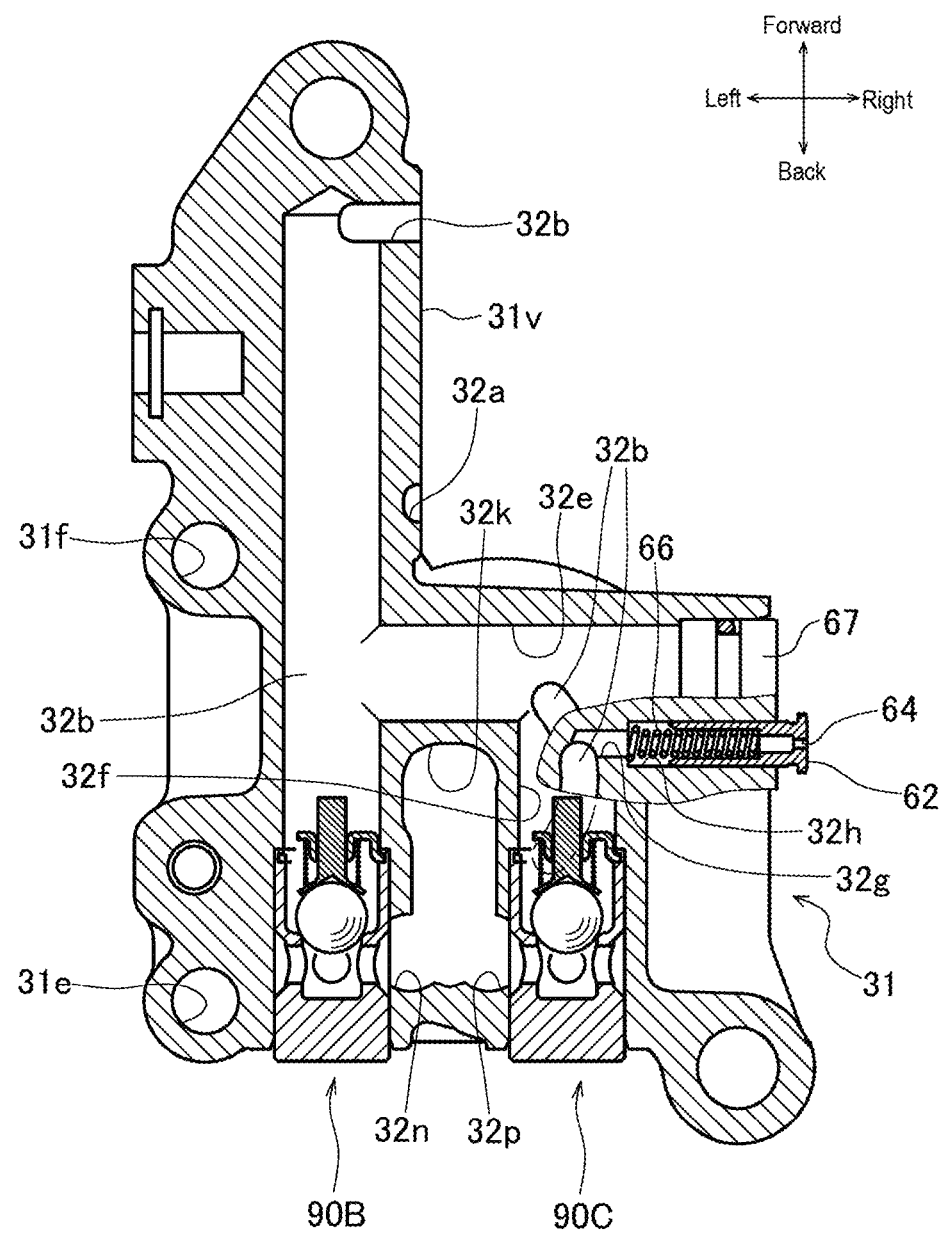
FIG. 16 is a sectional view of the HST (center case portion) at position K-K in FIG. 17.
Figure 17:
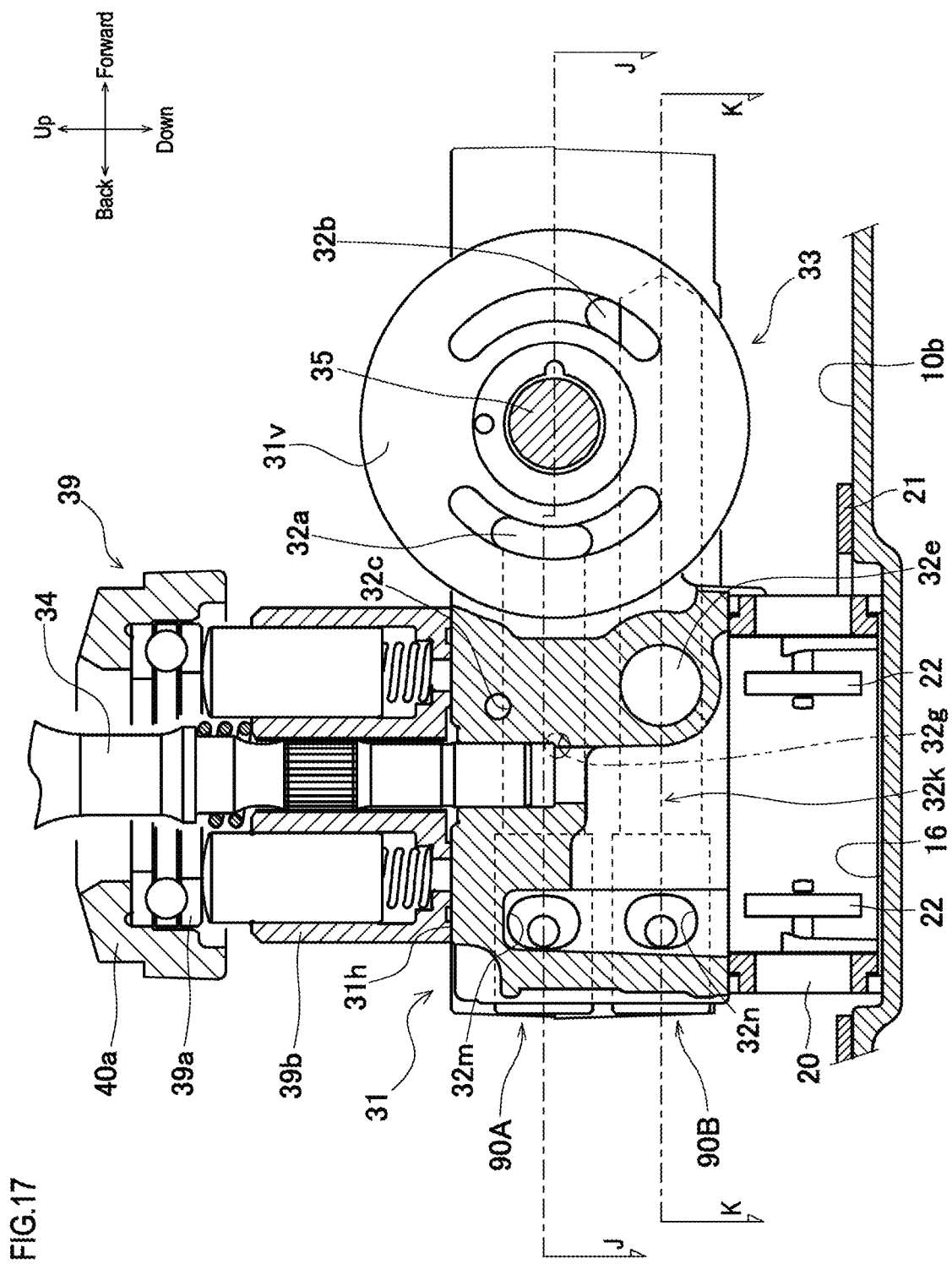
FIG. 17 is a sectional view of the HST (center case portion) at position G-G in FIG. 17.
Figure 18:
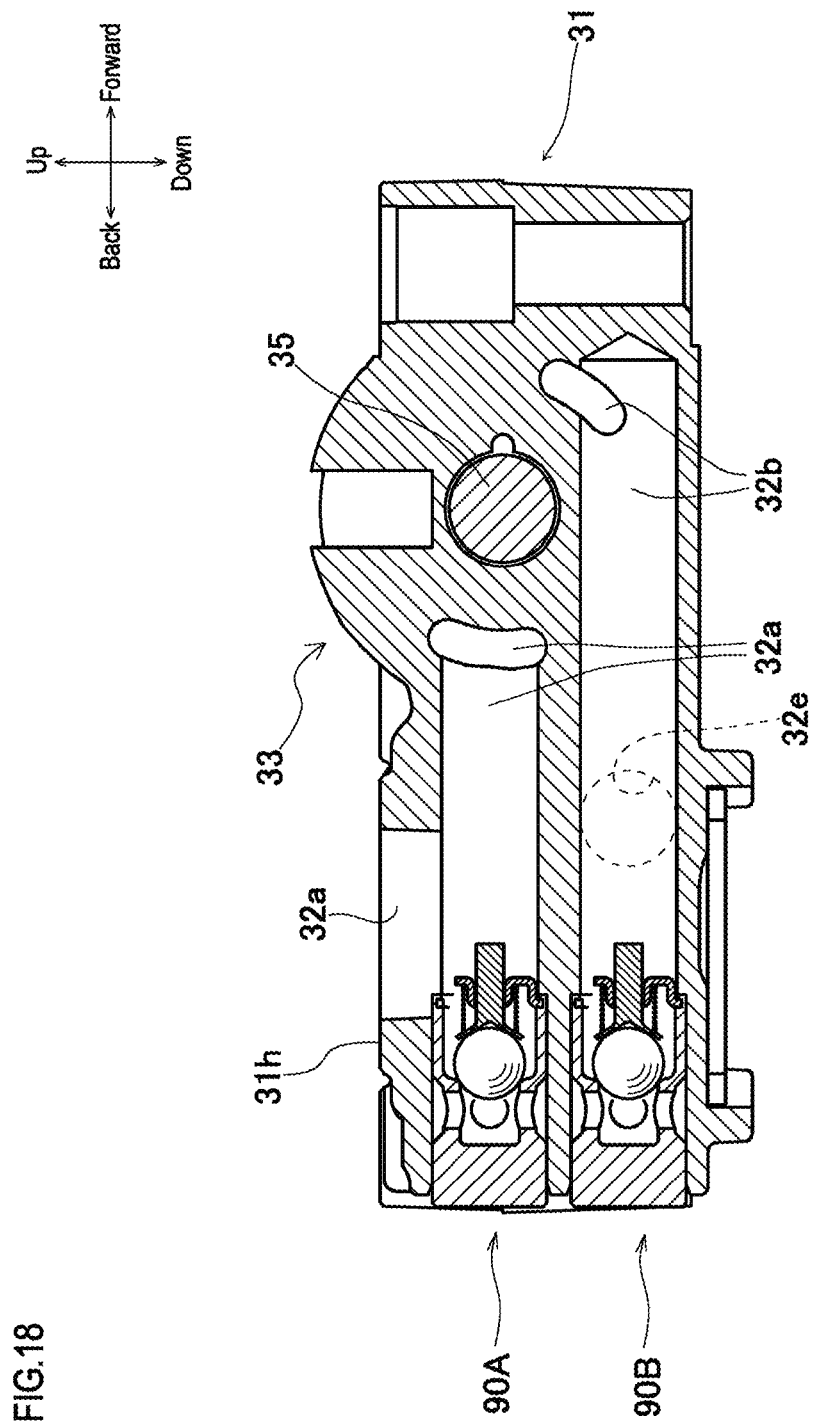
FIG. 18 is a sectional view of the HST (center case portion) at position H-H in FIG. 17.
Figure 19:
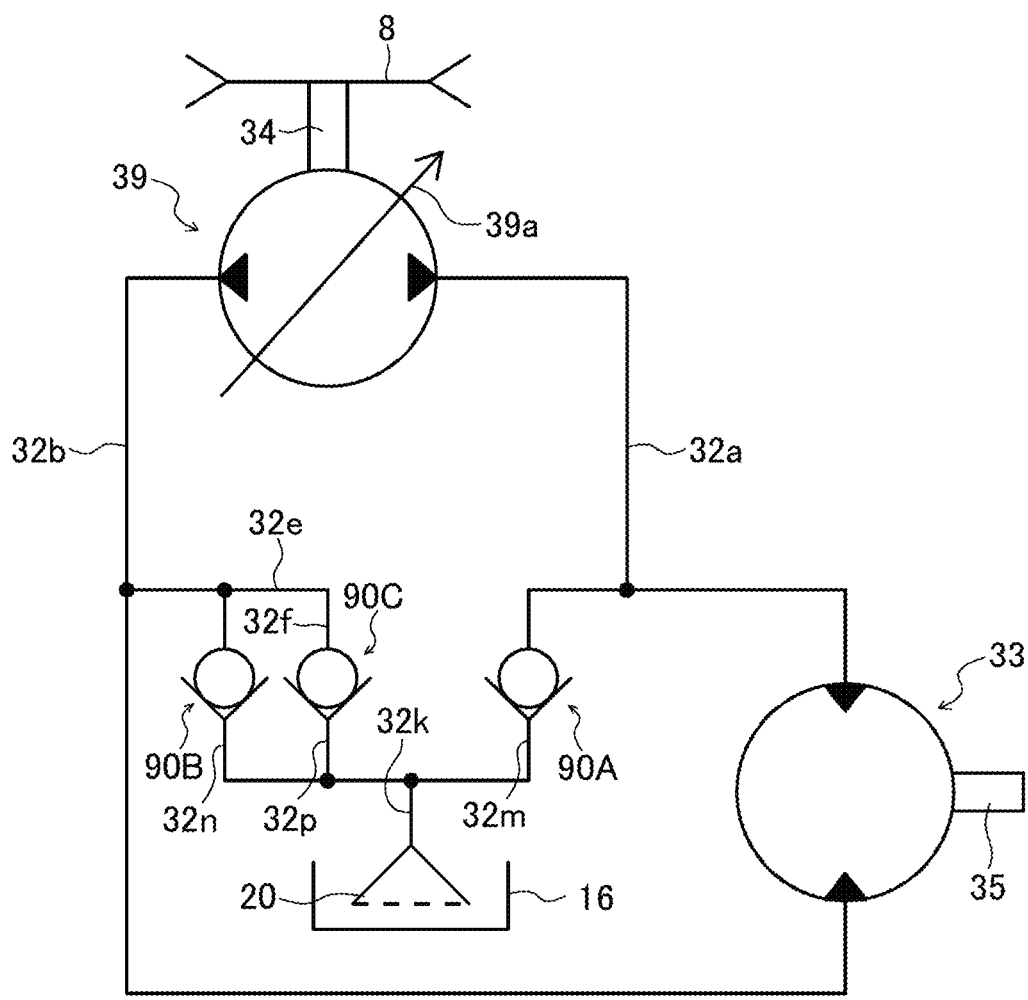
FIG. 19 is a hydraulic circuit diagram of the HST.
Figure 20:
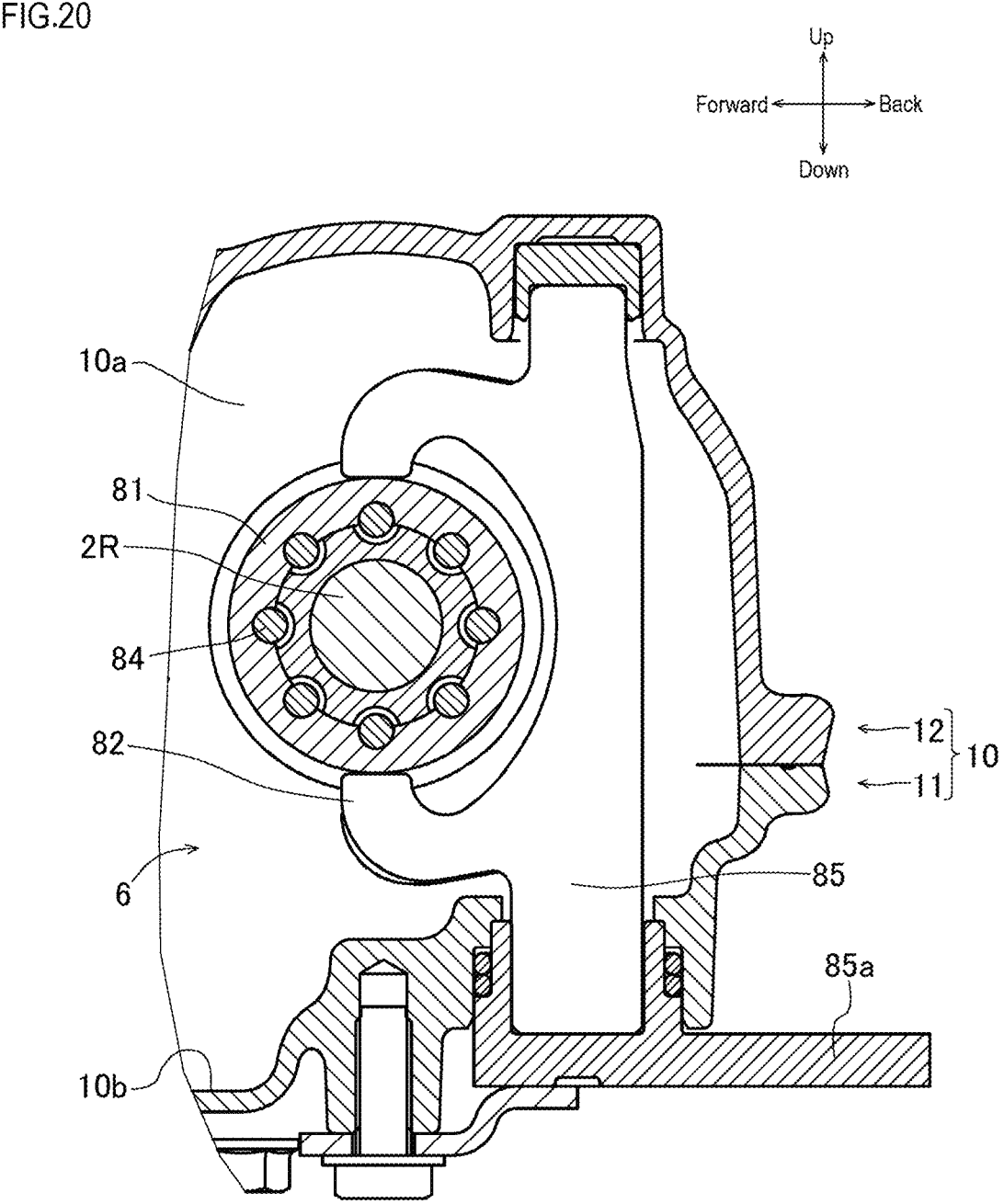
FIG. 20 is a partial sectional view of a differential lock mechanism at position XX in FIG. 1.

As shown in FIG. 13, the movable swash plate holder 40 is integrally configured by inserting the second trunnion shaft 40c into a hole 40d formed at the left end portion of the holder body 40a in a separable manner, and fixing the second trunnion shaft 40c to the holder body 40a with a bolt 40e. The end portion of the second trunnion shaft 40c on the side of the holder body 40a includes a recess 40f cut in the shape of width across flats, and a cylindrical outer periphery of the second trunnion shaft 40c forms a projection to constitute an uneven groove.

In the plate 65, a hole 65a for insertion of the second trunnion shaft 40c is formed. The hole 65a has a shape having a projection 65b in the shape of width across flats corresponding to the recess 40f of the second trunnion shaft 40c, and a cylindrical inner periphery of the hole 65a forms a recess to constitute an uneven groove.

When the second trunnion shaft 40c is inserted into the hole 65a, the uneven groove on the second trunnion shaft 40c side and the uneven groove on the plate 65 side are engaged with each other, whereby the plate 65 becomes slidable in the axial direction with respect to the second trunnion shaft 40c and relatively non-rotatable.

At the time of assembling the movable swash plate holder 40 to the upper housing 11, the holder body 40a needs to be moved to the left inner wall side by the length of the first trunnion shaft 40b in order to insert the first trunnion shaft 40b into the shaft hole 11d, and it is thus necessary to ensure a margin (gap) for the length. The plate 65 is disposed between the holder body 40a, the upper housing 11, and the left inner wall by utilizing the gap for the plate.

Although the present embodiment shows the example in which a recess having the shape of width across flats is formed in the second trunnion shaft 40c to form an uneven groove, the form of the uneven groove formed in the second trunnion shaft 40c and the uneven groove on the plate 65 side corresponding thereto is not limited thereto, but various forms such as knurls can be adopted.

Assembling Procedure for Movable Swash Plate Holder

At the time of assembling the movable swash plate holder 40 to the upper housing 11, first, the first trunnion shaft 40b is inserted into the shaft hole 11d with the second trunnion shaft 40c removed, and the holder body 40a and the first trunnion shaft 40b are disposed at predetermined positions. At this time, the respective axial center positions of the hole 40d of the holder body 40a and the hole 11e of the upper housing are disposed coaxially.

Next, the plate 65 is disposed in a gap between the holder body 40a and the left inner wall of the upper housing 11. At this time, the axial center position of the hole 65a of the plate 65 is disposed coaxially to the axial center positions of the hole 40d of the holder body 40a and the hole 11e of the upper housing 11.

Then, the second trunnion shaft 40c is inserted into the hole 11e of the upper housing, the hole 65a of the plate 65, and the hole 40d of the holder body 40a. At this time, the projection 65b of the plate 65 is locked by the recess 40f of the second trunnion shaft 40c.

Finally, the second trunnion shaft 40c is fastened to the holder body 40a with the bolt 40e to complete the assembly of the movable swash plate holder 40 to the upper housing 11.

In the transaxle 1, due to no need for a bolt or the like for fixing the first trunnion shaft 40b to the holder body 40a, the axial length of the first trunnion shaft 40b can be made small, thereby achieving the size reduction. Further, due to reduction in bolt fastening location, the efficiency of the assembly work is improved in the transaxle 1.

Center Case Oil Passage

As shown in FIGS. 1 to 7 and 14 to 18, oil passages 32a, 32b, 32c, 32d, 32e, 32f, 32g, 32h, 32k, 32m, 32n, and 32p are formed in the center case 31 constituting the HST 3. The oil passages 32a, 32b are provided to be vertically arranged in parallel from the back surface of the center case 31 toward the front.

The horizontal oil passage 32e is branched rightward from the oil passage 32b, and the oil passage 32d expanded in diameter is formed at the outer opening end portion of the oil passage 32e. The oil passage 32d is closed by an upper internal damping system (IDS) valve 61.

The horizontal oil passage 32e is branched rightward from the oil passage 32a, and the horizontal oil passage 32f is branched rearward from the oil passage 32e. From the oil passage 32f, the horizontal oil passage 32g is branched rightward so as to be parallel to the oil passage 32e, and the oil passage 32h having an enlarged diameter is formed at the outer opening end portion of the oil passage 32g. The oil passage 32h is closed by a lower IDS valve 62.

An oil suction port 32k opened downward is formed in the center case 31. The oil suction port 32k communicates with the oil passage 32a through an internal port 32n, and communicates with the oil passage 32b through an internal port 32m. Further, the oil suction port 32k communicates with the oil passage 32f through an internal port 32p. The oil filter 20 is provided between the oil suction port 32k and the oil reservoir 16, and hydraulic oil accumulated in the oil reservoir 16 can be sucked into the center case 31 through the oil filter 20. Charge check valves (charge check valves 90 to be described later) are interposed between the oil passage 32a and the internal port 32m, between the oil passage 32b and the internal port 32n, and between the oil passage 32f and the internal port 32p. The end opening of the oil passage 32e is sealed with a plug 67.

Charge Check Valve

In the HST 3, when the hydraulic oil circulating in the closed circuit decreases, the hydraulic oil is replenished from the low pressure side of the closed circuit (the pair of oil passages 32a, 32b) between the hydraulic pump 39 and the hydraulic motor 33 of the HST 3 from the oil reservoir 16 through the oil filter 20 and further through the charge check valve (Hereinafter also referred to as CV) 90.

As shown in FIGS. 14 to 19, in the HST 3, CVs 90 having the same configuration are provided in the oil passages 32a, 32b formed in the center case 31, respectively. In the following description, the CV 90 provided in the oil passage 32a is also called a first CV 90A, and the CV 90 provided in the oil passage 32b is also referred to as a second CV 90B.

In the HST 3, a third CV 90 (hereinafter referred to as third CV 90C) is provided in parallel with the second CV 90B in the oil passage 32f branched from the oil passage 32b. Since the passage length of the oil passage 32b is larger than that of the oil passage 32a, the hydraulic oil is hardly sucked by itself into the oil passage 32b. In the HST 3, the CVs 90 are provided in parallel on the side of the oil passage 32b having a larger passage length to compensate the oil passage 32b for the self-priming performance of the hydraulic oil.

IDS (Internal Damping System)

As shown in FIGS. 1 to 7 and FIGS. 14 to 18, the upper and lower IDS valves 61, 62 are made of piston-like members, and are configured to be movable in the axial direction of the oil passages in the oil passages 32d, 32h, respectively. The respective IDS valves 61, 62 are provided with an upper orifice 63 and a lower orifice 64 having shapes open outward and constantly communicating with the respective oil passages 32a, 32b, and pressure oil in the closed circuit communicates with (i.e., can be drained to) the oil reservoir 16 in the transaxle case 10 through the orifices 63, 64. That is, each of the IDS valves 61, 62 can discharge a part of the hydraulic oil circulating between the hydraulic pump 39 and the hydraulic motor 33 to the oil reservoir 16 in the center case 31.

The internal damping system (IDS) 60 is configured by constantly sliding the plate 65 on the outer end surface of each of the IDS valves 61, 62.

The IDS 60 is provided for reducing the impact of dynamic brake and the forward/backward starting by the following manner: while the movable swash plate 39a as the volume changing means returns to neutral, the end surfaces of the respective IDS valves 61, 62 press the plate 65 to reduce the speed at which the movable swash plate 39a returns to neutral, and secondarily to drain the pressure oil in the closed circuit through the orifices 63, 64.

Coil springs 66, 66 are interposed between the inner ends of the respective IDS valves 61, 62 and the inner ends of the oil passages 32d, 32h, so that the IDS valves 61, 62 are energized outward, respectively. That is, the respective IDS valves 61, 62 are pressed outward by the hydraulic pressure in the respective oil passages 32a, 32b and the energizing force of the coil springs 66, 66, and the frictional force of the respective IDS valves 61, 62 to the plate 65 by the combination of the hydraulic pressure in the closed circuit and the energizing forces of the coil springs 66, 66 is set to be smaller than that of a coiled and torsional neutral return spring 80 (neutral energization means) wound around the second trunnion shaft 40c. A contact member 69 in contact with the opposite side of the plate 65 is disposed on the opposite side of the plate 65 from the side where the respective IDS valves 61, 62 are in contact, in order to prevent the plate 65 from being warped when pressed by the respective IDS valves 61, 62.

Grooves 86, 87 are formed on the contact surfaces of the plate 65 with the respective IDS valves 61, 62. The groove 86 is a groove formed in a contact area with the upper IDS valve 61, and is configured to allow the hydraulic oil to flow out of the oil passage 32a through the groove 86 when the orifice 63 of the upper IDS valve 61 is located in the groove 86. The groove 87 is a groove formed in a contact area with the lower IDS valve 62, and is configured so as to allow hydraulic oil to flow out of the oil passage 32b through the groove 87 when the orifice 64 of the IDS valve 62 is located in the groove 87.

Bypass Mechanism

As shown in FIGS. 1 to 7, a bypass operation lever 55 for opening the oil passages 32a, 32b to the oil reservoir 16 is disposed above the upper housing 11 so that the axle can be idled during traction. The base of the bypass operation lever 55 is fixed to the upper end of a bypass lever shaft 56 rotatably supported so as to be turnable in the vertical direction on the upper wall of the upper housing 11, and the lower end of the bypass lever shaft 56 extends to the inside of the center case 31. Further, a pushpin 57 (c.f., FIG. 5) capable of abutting the rotary sliding surface of the cylinder block 33a supported by the center case 31 is disposed inside the center case 31, and the end surface of the pushpin 57 abuts a flat surface formed on the lower end side surface of the bypass lever shaft 56. When a driver operates the bypass operation lever 55 outside the housing at the time of traction of the vehicle, the bypass lever shaft 56 is turned, the flat surface of the lower end thereof is inclined, to push the pushpin 57 in the direction of the cylinder block 33a, and the pushpin 57 releases the close contact state between the vertical surface 31v and the cylinder block 33a, whereby the oil passages 32a, 32b communicate with the oil reservoir in the transaxle case 10, and the motor shaft 35 can rotate freely.

In the present embodiment, the diameter of the cylinder block 39b of the hydraulic pump 39 is small as compared to the diameter of the cylinder block 33a of the hydraulic motor 33. The total volume of the cylinders for accommodating the pistons (plungers) formed in the cylinder block 39b is smaller than the total volume of the cylinders for accommodating the pistons 33b formed in the cylinder block 33a. In the transaxle 1, the amounts of oil discharged and drawn per rotation of the cylinder block 39b of the hydraulic pump 39 is smaller than the amounts of oil discharged and drawn per rotation of the cylinder block 33a of the hydraulic motor 33, and the rotation speed of the motor shaft 35 of the hydraulic motor 33 has been reduced as compared to the rotation speed of the pump shaft 34 of the hydraulic pump 39 (i.e., the transaxle 1 is configured to perform a hydraulic rotation speed reduction).

Reduction Gear Train

In addition to the above hydraulic rotation speed reduction, as shown in FIGS. 1 to 7, the reduction gear train 4 disposed in the storage chamber 10a is made up of a motor output gear 41, a counter shaft 42, a large-diameter counter gear 43, a small-diameter counter gear 44, and the ring gear 51 that is a final gear located in the last row of the reduction gear train 4 and also is the input gear of the differential gear device 5.

The motor output gear 41 is fixed to the left end portion of the motor shaft 35. A brake disc 70 is fixed to a further left end side of the motor shaft 35. That is, in the transaxle 1, the motor output gear 41 is disposed on the right side (the side adjacent to HST 3) of the brake disc 70, and such a placement has enabled the size reduction of the transaxle case 10.

The counter shaft 42 extends in the right-left horizontal direction and is disposed between the motor shaft 35 in front of the counter shaft 42 and a differential gear device 5 behind the counter shaft 42. The left end of the counter shaft 42 is supported by the transaxle case 10, and the right end of the counter shaft 42 is supported by a shaft hole 31g formed in the center case 31.

In the conventional configuration, generally, a partition wall is provided inside the storage chamber 10a such that the storage chamber 10a is divided into a part (HST chamber) for accommodating the HST 3 and a part (gear chamber) for accommodating the reduction gear train 4, and the right end of the counter shaft 42 is supported by this partition wall. In the transaxle 1 of the present embodiment, with the partition wall being omitted for reducing the size, the right end of the counter shaft 42 is supported by the center case 31.

The small-diameter counter gear 44 is mounted on the counter shaft 42, and its rear end meshes with the ring gear 51. The large-diameter counter gear 43 is fixed to the small-diameter counter gear 44, and the front end of the large-diameter counter gear 43 meshes with the motor output gear 41. In the transaxle 1, the large-diameter counter gear 43 is disposed on the right side (the side adjacent to HST 3) of the ring gear 51 meshing with the small-diameter counter gear 44, and such a placement has enabled the size reduction of the transaxle case 10.

Thus, the reduction gear train 4 is configured to transmit power from the motor shaft 35 to the ring gear 51 through the motor output gear 41, the large-diameter counter gear 43, and the small-diameter counter gear 44.

Of the gears constituting the reduction gear train 4, only the ring gear 51 is a sintered article (i.e., made from a sintered material), and the other gears, which are the motor output gear 41, the large-diameter counter gear 43, and the small-diameter counter gear 44, are steel articles. In the transaxle 1, at least the large-diameter and heavy ring gear 51 is made a sintered article, to hold down the manufacturing cost of the ring gear 51. Further, the ring gear 51 having the largest diameter, the lowest rotation, and the smallest meshing frequency among the gears constituting the reduction gear train 4 is made as a sintered article, to reduce the amount of abrasion powder generated.

Brake Device

Figure 2:
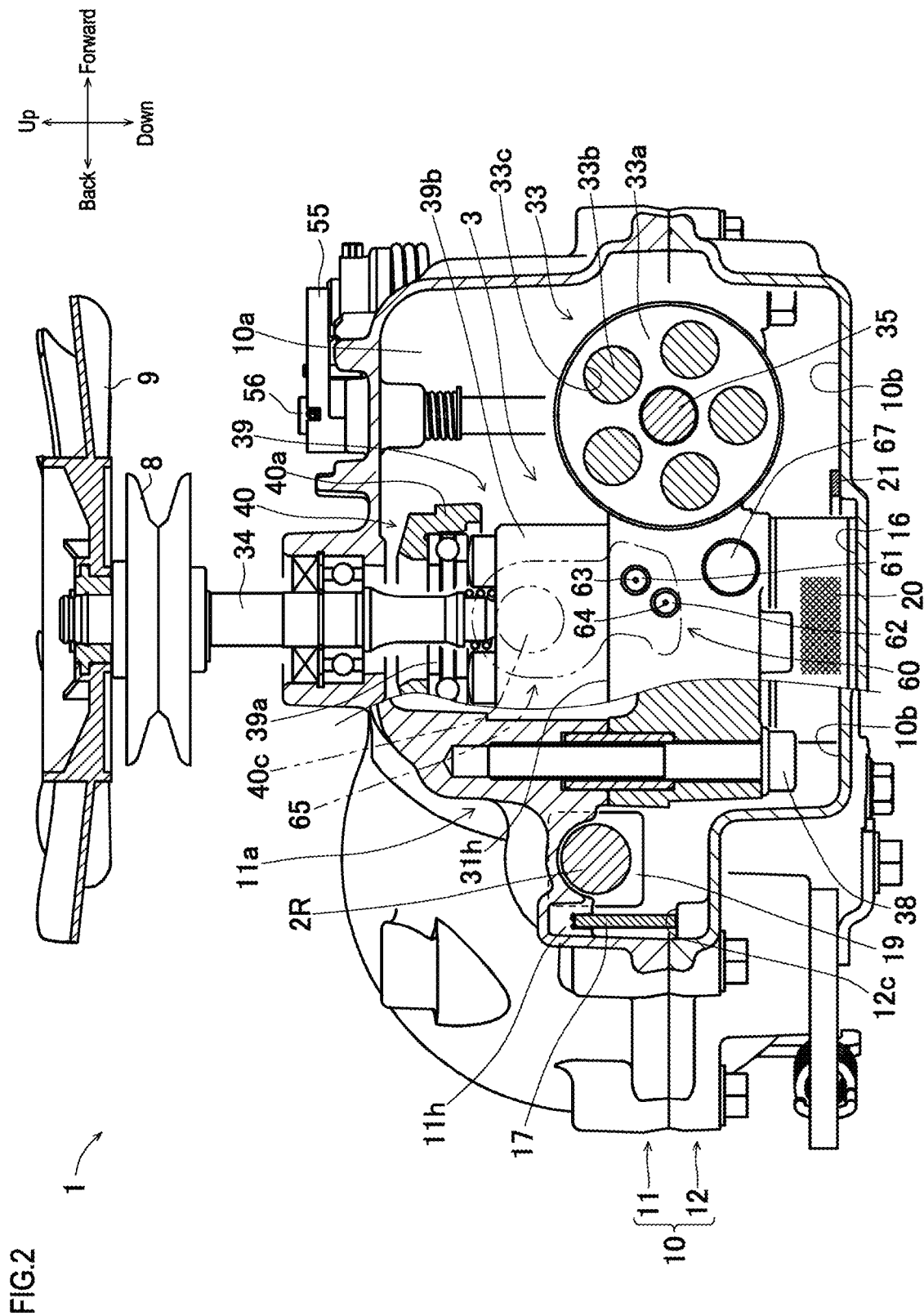
FIG. 2 is a sectional view of the transaxle at position A-A in FIG. 1.

As shown in FIGS. 1 and 2, the brake mechanism 7 for braking the motor shaft 35 is disposed in the front end portion of the storage chamber 10a. The brake mechanism 7 includes the flange-shaped brake disc 70 fixed on the motor shaft 35, a vertical camshaft 71 as an example of a brake shaft portion, a brake shoe 72, and a brake pad 73. The brake shoe 72 and the brake pad 73 are examples of brake parts that brake the axles 2L, 2R.

The camshaft 71 is rotatably supported by a transaxle case 10, and the upper portion of the camshaft 71 projects upward from the transaxle case 10. On the other hand, in the storage chamber 10a, a portion being semicircular in a cross-sectional view and having a vertical cam surface 71a is formed in the camshaft 71. The cam surface 71a faces the brake shoe 72 disposed between the camshaft 71 and the front end portion of the brake disc 70.

In the brake mechanism 7, the brake pad 73 is mounted on the wall of a transaxle case 10, and the front end portion of the brake disc 70 is disposed between the brake shoe 72 and the brake pad. Normally, as shown in FIG. 1, the camshaft 71 is positioned in the turning direction so that the cam surface 71a is located in a non-braking position that is extended parallel to the brake shoe 72, whereby the brake disc 70 is separated from the brake shoe 72 and the brake pad 73, and the rotation of the motor shaft 35 is held in a state where the brake is not applied.

In the transaxle 1, the brake disc 70 constituting the brake mechanism 7 is separated from the motor output gear 41, and the brake disc 70 worn only during braking is made as a sintered article (i.e., made from a sintered material), thereby reducing the generation of abrasion powder.

Differential Mechanism

Figure 3:
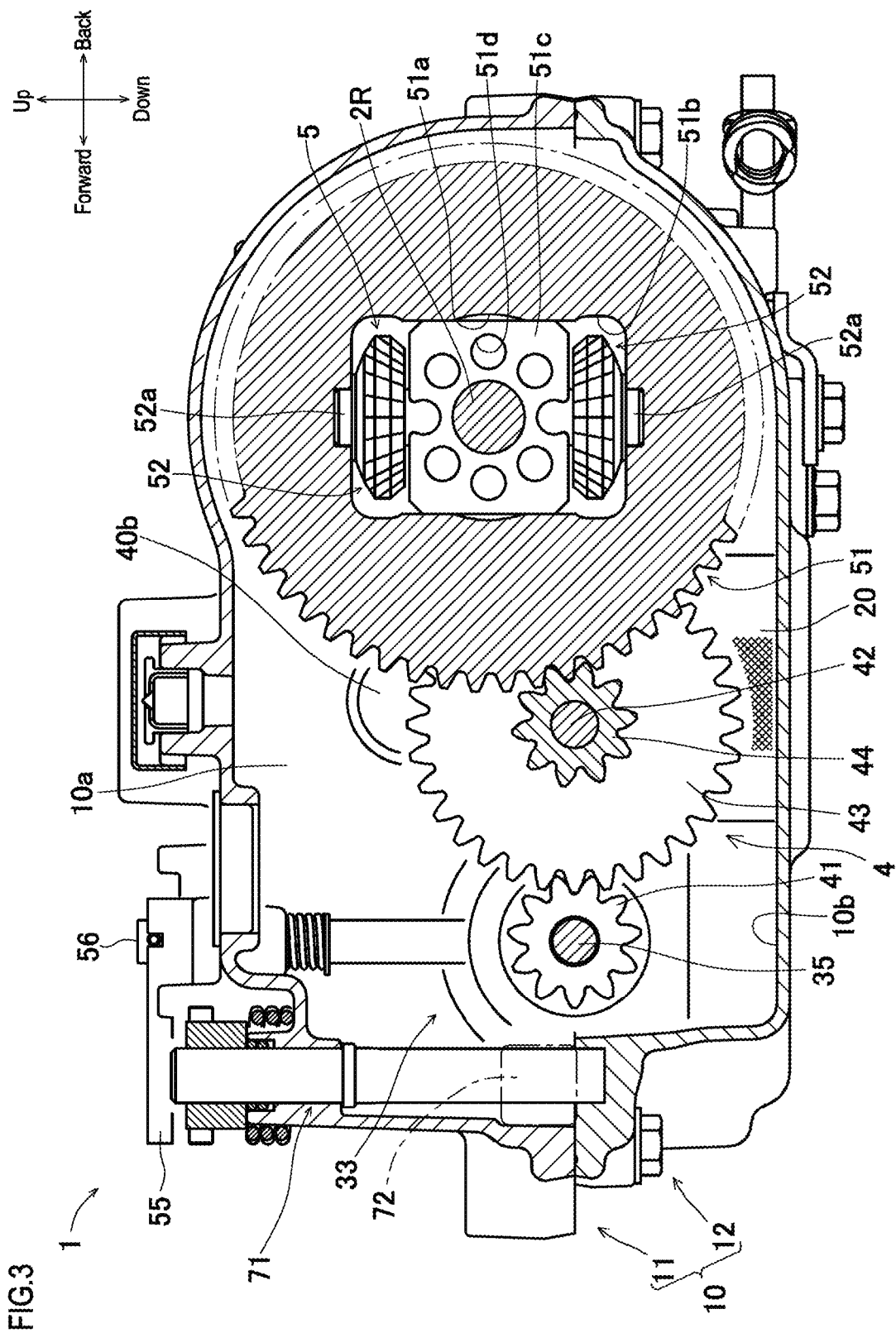
FIG. 3 is a sectional view of the transaxle at position B-B in FIG. 1.

As shown in FIGS. 1 to 7, the differential gear device 5 includes a ring gear 51, two pinion gears 52, a first side gear 53, and a second side gear 54. As shown in FIG. 3, the ring gear 51 has a shaft hole 51a, two gear holes 51b, and a plate 51c having a fitting hole formed therein. The shaft hole 51a is a through hole formed in the center of the ring gear 51 and receives a left axle 2L and a right axle 2R. The gear holes 51b are through-holes respectively formed on both sides of the shaft hole 51a and receive the pinion gears 52. The plate 51c receives the differential lock mechanism 6.

Each of the pair of pinion gears 52 is made rotatable in the gear hole 51b of the ring gear 51 through a support shaft 52a. The first side gear 53 is disposed on the left side surface which is one side surface of the ring gear 51, and spline-fitted to the left axle 2L. The second side gear 54 is disposed on the right side surface which is the other side surface of the ring gear 51, and spline-fitted to the right axle 2R. The first side gear 53 and the second side gear 54 mesh with the two pinion gears 52.

With the differential gear device 5, the left axle 2L and the right axle 2R can be rotated differentially.

Differential Lock Mechanism

As shown in FIGS. 1 to 7 and FIG. 20, the differential lock mechanism 6 is configured by combining a differential lock slider 81, a differential lock fork 82, and a spring 83. The plate 51c of the ring gear 51 is formed with the recess 51d for fitting of a differential lock pin 84. Corresponding to the recess 51d, the differential lock pin 84 is projected on the side of the differential lock slider 81 facing the ring gear 51.

As for the position of the differential lock slider 81, the differential lock fork 82 is turned in accordance with the turning of a turning shaft 85 by the operation of the differential lock arm 85a, and by the turning, the differential lock slider 81 is switched to one of a differential lock position on the left axle 2L side and a differential lock releasing position on the right axle 2R side. The differential lock slider 81 is constantly energized by a spring 83 in the direction of the differential lock releasing position. The differential lock mechanism 6 can be operated by the driver turning the turning shaft 85 against the spring force of the spring 83 to displace the differential lock slider 81 to the differential lock position where the differential lock pin 84 is fitted into the recess 51d.

The above description is directed to a particular embodiment according to the invention, and numerous modifications are possible without departing from the spirit of the invention. The appended claims are intended to cover such applications within the true scope and spirit of the invention.

Therefore, all embodiments disclosed herein are to be considered as illustrative and not restrictive. The scope of the invention is indicated in the following claims rather than in the above description, and should include all modifications to the extent that the modifications fall within the scope of equivalents to the meaning of the claims.

What is claimed is:

1. A hydraulic transaxle, comprising:
   an axle;
   a hydraulic static transmission that includes a hydraulic pump driven by a drive source, a hydraulic motor in which a motor shaft is rotated and driven by hydraulic oil supplied by the hydraulic pump, and a center case in which a pair of oil passages for circulating the hydraulic oil between the hydraulic pump and the hydraulic motor is formed;
   a gear mechanism that transmits an output of the hydraulic static transmission to the axle; and a case that supports the axle and accommodates the hydraulic static transmission to form an oil reservoir, wherein the case comprises an upper housing and a lower housing that are removably joined together;

wherein the hydraulic motor includes the motor shaft that is an output shaft, a cylinder block in which a plurality of cylinders are formed and that is coaxially fixed to the motor shaft, a plurality of pistons inserted into the cylinders, a fixed swash plate abutted by the plurality of pistons, and a fixed swash plate holder that supports the fixed swash plate with respect to the case, wherein the center case comprises a bearing configured to support the motor shaft on a back side of a placement surface for the cylinder block in the center case, wherein the center case further comprises a shaft hole for insertion of the motor shaft orthogonal to the placement surface, wherein the fixed swash plate holder is fixed in position by a portion of the upper housing and a portion of the lower housing, wherein the fixed swash plate holder comprises a bearing configured to support the motor shaft, and wherein the motor shaft of the hydraulic motor is bearing-supported by the center case and the fixed swash plate holder.

2. The hydraulic transaxle according to claim 1, wherein the case includes two supporting surfaces that support the fixed swash plate holder such that the supporting surfaces face each other, wherein the fixed swash plate holder includes supported surfaces in contact with the supporting surface such that the supported surfaces face the supporting surfaces, and wherein a bearing hole for the motor shaft is provided at a midpoint of the two supported surfaces in the fixed swash plate holder.

3. The hydraulic transaxle according to claim 2, wherein the case is made up of at least two case members that are separated and joined on a plane including a motor axis, and wherein one of the two supporting surfaces in contact with the respective supported surfaces are provided in each of the respective case members so as to sandwich the fixed swash plate holder when the two case members are joined.

4. The hydraulic transaxle according to claim 1, wherein the center case comprises a recess for fitting the bearing configured to support the motor shaft on the back side of a placement surface for the hydraulic motor in the center case, and wherein the center case further comprises the pair of the oil passages between the bearing fitted in the recess and the placement surface for the hydraulic motor, with the shaft hole located between the pair of oil passages.

5. The hydraulic transaxle according to claim 4, wherein one of the pair of oil passages has a larger oil passage length and is provided with two check valves that allow suction of oil in the oil reservoir only during replenishment of hydraulic oil, and wherein the other of the oil passages has a smaller oil passage length and is provided with one check valve.

6. The hydraulic transaxle according to claim 4, wherein a shaft hole for rotatably supporting a rotating shaft included in the gear mechanism is formed on the back side of the placement surface for the hydraulic motor in the center case.

7. The hydraulic transaxle according to claim 6, wherein the gear mechanism comprises a final gear fixed to the axle and a counter gear that meshes with a motor output gear on the motor shaft, and wherein the counter gear is disposed between the final gear and the center case.

8. A hydraulic transaxle, comprising:

an axle;

a hydraulic static transmission that includes a hydraulic pump driven by a drive source, a hydraulic motor in which a motor shaft is rotated and driven by hydraulic oil supplied by the hydraulic pump, and a center case in which a pair of oil passages for circulating the hydraulic oil between the hydraulic pump and the hydraulic motor is formed;

a gear mechanism that transmits an output of the hydraulic static transmission to the axle; and a case that supports the axle and accommodates the hydraulic static transmission to form an oil reservoir, wherein the case does not include a partition wall separating the hydraulic static transmission from the gear mechanism;

wherein the hydraulic motor includes a cylinder block in which a plurality of cylinders are formed and that is coaxially fixed to the motor shaft, a plurality of pistons inserted into the cylinders, a fixed swash plate abutted by the plurality of pistons, and a fixed swash plate holder that supports the fixed swash plate with respect to the case, and the motor shaft of the hydraulic motor is bearing-supported by the center case and the fixed swash plate holder, wherein the case includes two supporting surfaces that support the fixed swash plate holder such that the supporting surfaces face each other, wherein the fixed swash plate holder includes supported surfaces in contact with the supporting surface such that the supported surfaces face the supporting surfaces, and wherein a bearing hole for the motor shaft is provided at a midpoint of the two supported surfaces in the fixed swash plate holder.

9. The hydraulic transaxle according to claim 8, wherein the case is made up of at least two case members that are separated and joined on a plane including a motor axis, and wherein one of the two supporting surfaces in contact with the respective supported surfaces are provided in each of the respective case members so as to sandwich the fixed swash plate holder when the two case members are joined.

10. The hydraulic transaxle according to claim 8, wherein the center case comprises a recess for fitting a bearing configured to support the motor shaft on a back side of a placement surface for the hydraulic motor in the center case, wherein the center case further comprises a shaft hole for insertion of the motor shaft orthogonal to the placement surface, and wherein the center case further comprises a pair of the oil passages between the bearing fitted in the recess and the placement surface for the hydraulic motor, with the shaft hole located between the pair of oil passages.

11. The hydraulic transaxle according to claim 10, wherein a shaft hole for rotatably supporting a rotating shaft included in the gear mechanism is formed on the back side of the placement surface for the hydraulic motor in the center case.

12. A hydraulic transaxle, comprising:
    an axle;
    a hydraulic static transmission that includes a hydraulic pump driven by a drive source, a hydraulic motor in which a motor shaft is rotated and driven by hydraulic oil supplied by the hydraulic pump, and a center case in which the pair of oil passages for circulating the hydraulic oil between the hydraulic pump and the hydraulic motor is formed;
    a gear mechanism that transmits an output of the hydraulic static transmission to the axle; and
    a case that supports the axle and accommodates the hydraulic static transmission to form an oil reservoir;
    wherein the hydraulic motor comprises:
        a cylinder block in which a plurality of cylinders are formed and that is coaxially fixed to the motor shaft,
        a plurality of pistons inserted into the cylinders,
        a fixed swash plate abutted by the plurality of pistons, and
        a fixed swash plate holder removably attached to the case and configured to support the fixed swash plate with respect to the case,
    wherein the motor shaft of the hydraulic motor is bearing-supported by the center case and the fixed swash plate holder,
    wherein the center case comprises a recess for fitting a bearing configured to support the motor shaft on a back side of a placement surface for the hydraulic motor in the center case,
    wherein the center case further comprises a shaft hole for insertion of the motor shaft orthogonal to the placement surface,
    wherein the center case further comprises the pair of the oil passages between the bearing fitted in the recess and the placement surface for the hydraulic motor, with the shaft hole located between the pair of oil passages, and
    wherein a shaft hole for rotatably supporting a rotating shaft included in the gear mechanism is formed on the back side of the placement surface for the hydraulic motor in the center case.

13. The hydraulic transaxle according to claim 12,
    wherein the case includes two supporting surfaces that support the fixed swash plate holder such that the supporting surfaces face each other,
    wherein the fixed swash plate holder includes supported surfaces in contact with the supporting surface such that the supported surfaces face the supporting surfaces, and
    wherein a bearing hole for the motor shaft is provided at a midpoint of the two supported surfaces in the fixed swash plate holder.

14. The hydraulic transaxle according to claim 13,
    wherein the case is made up of at least two case members that are separated and joined on a plane including a motor axis, and
    wherein one of the two supporting surfaces in contact with the respective supported surfaces are provided in each of the respective case members so as to sandwich the fixed swash plate holder when the two case members are joined.

* * * * *